(12) United States Patent
Endo

(10) Patent No.: US 9,214,189 B2
(45) Date of Patent: Dec. 15, 2015

(54) IMAGE EDITING APPARATUS, IMAGE EDITING METHOD, AND STORAGE MEDIUM STORING IMAGE EDITING CONTROL PROGRAM

(75) Inventor: Kota Endo, Sagamihara (JP)

(73) Assignee: CASIO COMPUTER CO., LTD., Tokyo (JP)

(*) Notice: Subject to any disclaimer, the term of this patent is extended or adjusted under 35 U.S.C. 154(b) by 637 days.

(21) Appl. No.: 13/596,466

(22) Filed: Aug. 28, 2012

(65) Prior Publication Data

US 2013/0051620 A1 Feb. 28, 2013

(30) Foreign Application Priority Data

Aug. 29, 2011 (JP) ................... 2011-186439
Dec. 27, 2011 (JP) ................... 2011-286707

(51) Int. Cl.
*G06K 9/00* (2006.01)
*G11B 27/00* (2006.01)
*G06T 7/20* (2006.01)

(52) U.S. Cl.
CPC .............. *G11B 27/00* (2013.01); *G06T 7/2033* (2013.01)

(58) Field of Classification Search
None
See application file for complete search history.

(56) References Cited

U.S. PATENT DOCUMENTS

| | | | |
|---|---|---|---|
| 6,760,048 B1* | 7/2004 | Bates et al. ................... | 715/797 |
| 2005/0163402 A1 | 7/2005 | Aiso | |
| 2007/0279498 A1* | 12/2007 | Nonaka ....................... | 348/220.1 |
| 2009/0153661 A1 | 6/2009 | Cheng et al. | |
| 2010/0073519 A1 | 3/2010 | Onoe et al. | |
| 2010/0150474 A1 | 6/2010 | Aiso | |
| 2011/0043639 A1* | 2/2011 | Yokohata ....................... | 348/169 |
| 2011/0051816 A1 | 3/2011 | Kitamura | |
| 2012/0242853 A1* | 9/2012 | Jasinski et al. ............. | 348/222.1 |
| 2012/0321137 A1 | 12/2012 | Cheng et al. | |

FOREIGN PATENT DOCUMENTS

| | | |
|---|---|---|
| CN | 101686367 A | 3/2010 |
| JP | 05-298591 A | 11/1993 |
| JP | 6-180756 A | 6/1994 |

(Continued)

OTHER PUBLICATIONS

Migliore, Davide, et al. "Use a single camera for simultaneous localization and mapping with mobile object tracking in dynamic environments." Proceedings of International workshop on Safe navigation in open and dynamic environments application to autonomous vehicles. 2009.*

(Continued)

*Primary Examiner* — Nirav G Patel
*Assistant Examiner* — Raphael Schwartz
(74) *Attorney, Agent, or Firm* — Holtz, Holtz, Goodman & Chick, PC

(57) ABSTRACT

An image editing method includes detecting positions of the moving object contained in the images for the stored series of images, detecting a locus of movement of the moving object based on the detected positions of the moving object contained in the series of images, specifying an image corresponding to a feature point of the detected locus of movement of the moving object, extracting, from the series of images stored in the memory, images which include the specified image and correspond to a second shooting time interval longer than the first shooting time interval, and storing the extracted series of images as an image file in a memory.

9 Claims, 21 Drawing Sheets

(56) References Cited

FOREIGN PATENT DOCUMENTS

| JP | 2004088518 A | 3/2004 |
| JP | 2004-180259 A | 6/2004 |
| JP | 2007-093432 A | 4/2007 |
| JP | 2007-115236 A | 5/2007 |
| JP | 2010028641 A | 2/2010 |
| JP | 2010-103878 A | 5/2010 |
| JP | 2010178318 A | 8/2010 |
| JP | 2010198559 A | 9/2010 |

OTHER PUBLICATIONS

Chinese Office Action dated Sep. 29, 2014, issued in counterpart Chinese Application No. 201210308069.1.

Extended European Search Report (EESR) dated Jan. 28, 2013 (in English) issued in counterpart European Application No. 12182006.2.

Japanese Office Action (and English translation thereof) dated May 26, 2015, issued in counterpart Japanese Application No. 2011-286707.

* cited by examiner

FIG.2

| IMAGE AND COORDINATE RANGE FILE | | | | | | | | |
|---|---|---|---|---|---|---|---|---|
| FILE NAME | EXTRACTED CONTINUOUSLY SHOT IMAGES | Δt | X: MINIMUM/ MAXIMUM VALUE | Y: MINIMUM/ MAXIMUM VALUE | X SCALE | Y SCALE | ACTUALLY MEASURED VALUE/ 1 SCALE | LAYER POSITION CORRECTION INFORMATION FOR EACH IMAGE |
| coaster.g3m |  | 0.4 s | -4 | -1.1 | 1 | 1 | 5 m | P2 (x2, y2), P4 (x4, y4), ..., P10 (x10, y10) |
| skateboard.g3m |  | 0.3 s | 8.0 | 3.2 | 1 | 1 | ... | — |

12f (32d)

FIG.11
| FILE NAME | CONTINUOUSLY SHOT IMAGES (ORIGINAL IMAGES) | Δt |
|---|---|---|
| ball | 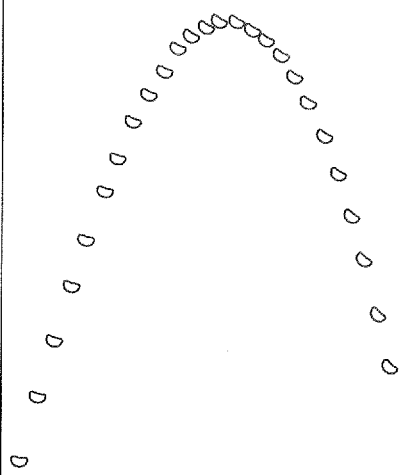 | 0.1 s |
| FILE NAME | CONTINUOUSLY SHOT IMAGES (SAMPLED EXTRACTED IMAGES) | Δt |
| ball.g3m | 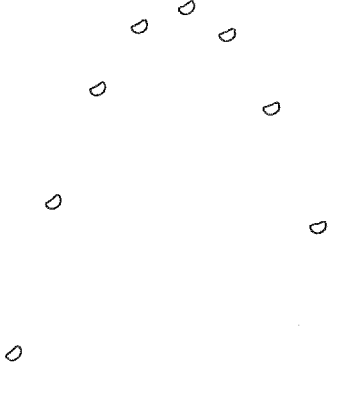 | 0.3 s |

FIG. 12

RECOMMENDED SAMPLING INTERVAL TABLE

| CONTINUOUS SHOOTING SPEED (IMAGES/SEC) | RECOMMENDED SAMPLING INTERVAL 1 | TIME INTERVAL (T SCALE VALUE) | 30 IMAGE →? IMAGES | RECOMMENDED SAMPLING INTERVAL 2 | T SCALE VALUE | 30 IMAGE →? IMAGES |
|---|---|---|---|---|---|---|
| 1/40 | 4→1 (EVERY FOUR) | 0.1 s | 7 IMAGES | 2→1 (EVERY OTHER) | 0.05 s | 14 IMAGES |
| 1/30 | 3→1 (EVERY THREE) | 0.1 s | 8 IMAGES | | | |
| 1/15 | 3→1 (EVERY THREE) | 0.2 s | 9 IMAGES | | | |
| 1/10 | 3→1 (EVERY THREE) | 0.3 s | 10 IMAGES | 2→1 (EVERY OTHER) | 0.2 s | 15 IMAGES |

12h

US 9,214,189 B2

IMAGE EDITING APPARATUS, IMAGE EDITING METHOD, AND STORAGE MEDIUM STORING IMAGE EDITING CONTROL PROGRAM

CROSS-REFERENCE TO RELATED APPLICATIONS

This application is based upon and claims the benefit of priority from prior Japanese Patent Applications No. 2011-186439, filed Aug. 29, 2011; and No. 2011-286707, filed Dec. 27, 2011, the entire contents of all of which are incorporated herein by reference.

BACKGROUND OF THE INVENTION

1. Field of the Invention

The present invention relates to an image editing apparatus, image editing method, and a storage medium storing an image editing control program, for use in editing a series of images shot at high speed.

2. Description of the Related Art

Recently, it is becoming popular to shoot images of a moving object using a digital camera having advanced moving image shooting and continuous shooting functions, analyze the locus of the moving object contained in the shot images, and utilize the continuously shot images for learning.

There has conventionally been proposed a locus-of-movement determination device having a function of determining the locus of a moving object from images shot by a camera (for example, Jpn. Pat. Appln. KOKAI Publication No. H06-180756).

Recent digital cameras have improved their performance, and can easily shoot 40 high-speed continuously shot images per second or a moving image of 240 fps (240 images per second).

However, when continuously shot images obtained by shooting the movement of an object are used for learning, if the number of images is excessively large, this imposes a heavy load on analysis processing. Further, learning becomes less effective unless continuously shot images include an image shot instantaneously when a moving object comes to a highest position or lowest position.

Therefore, creating learning materials of images by shooting a moving object requires a mechanism capable of appropriately extracting images from a large volume of continuously shot images/moving image, and using them.

BRIEF SUMMARY OF THE INVENTION

Accordingly, it is an object of the invention to provide an image editing apparatus, image editing method, and a storage medium storing an image editing control program, capable of appropriately extracting images from a series of continuously shot images/moving image obtained by shooting a moving object, and thereby generating effective learning materials.

According to one aspect of the present invention, there is provided an image editing apparatus comprising: an image storage unit storing a series of images obtained by shooting a moving object at a first shooting time interval; a moving position detection unit configured to detect positions of the moving object contained in the images for the series of images stored in the image storage unit; a locus-of-movement detection unit configured to detect a locus-of-movement of the moving object based on the positions of the moving object contained in the series of images that have been detected by the moving position detection unit; a feature image specifying unit configured to specify an image corresponding to a feature point of the locus of movement of the moving object that has been detected by the locus-of-movement detection unit; an image extraction unit configured to extract, from the series of images stored in the image storage unit, images which include the image specified by the feature image specifying unit and correspond to a second shooting time interval longer than the first shooting time interval; and an extracted image file storage unit configured to store the series of images extracted by the image extraction unit as an image file.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a table showing the first example of an image & coordinate range file stored in an image & coordinate range file storage unit 12f of the PC 10;

FIG. 11 is a view showing the second example of an image & coordinate range file stored in the image & coordinate range file storage unit 12f of the PC 10;

FIG. 12 is a table showing a recommended sampling interval table 12h which is stored in advance in a storage unit 12 for image file generation processing (second embodiment) by the PC 10;

DETAILED DESCRIPTION OF THE INVENTION

Embodiments of the present invention will now be described with reference to the accompanying drawing.

Figure 1:
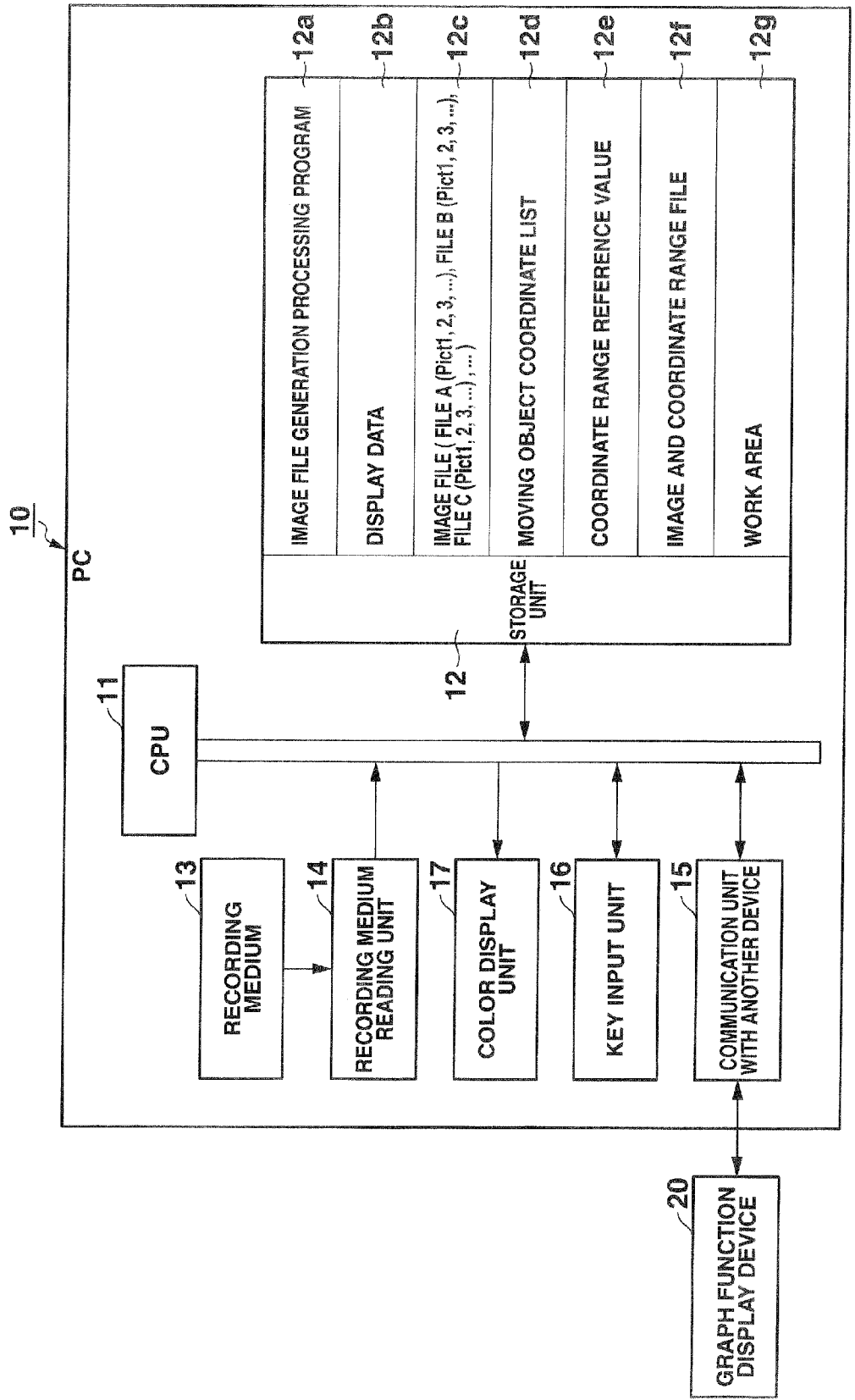
FIG. 1 is a block diagram showing the arrangement of the electronic circuit of a PC 10 having an image file generation function according to an embodiment of an image editing apparatus in the present invention.

FIG. 1 is a block diagram showing the arrangement of the electronic circuit of a PC 10 having an image file generation function according to an embodiment of an image editing apparatus in the present invention.

The PC 10 includes a processor (CPU) 11 serving as a computer.

The processor (CPU) 11 controls the operations of respective circuit units according to a PC control program stored in advance in a storage unit (flash ROM) 12, a PC control program loaded from an external recording medium 13 such as a CD-ROM into the storage unit 12 via a recording medium reading unit 14, or a PC control program which is downloaded by an external device communication unit 15 from a Web server (program server) on a communication network such as the Internet and is loaded into the storage unit 12. The PC control program stored in the storage unit 12 is activated in accordance with a key input signal from a key input unit 16.

The storage unit 12, the recording medium reading unit 14, the external device communication unit 15, the key input unit 16, and a color display unit (LCD) 17 are connected to the processor (CPU) 11.

The PC control programs stored in the storage unit (flash ROM) 12 include various application programs such as a Web browser program and image processing program. In addition, the PC control programs include an image file generation processing program 12a for generating an image & coordinate range file (12f) (FIG. 2) which can be effectively used as learning materials in a graph function display device 20 (to be described later) based on, for example, a large amount of image data obtained by continuous shooting.

The storage unit 12 includes a display data storage unit 12b, an image file storage unit 12c, a moving object coordinate list storage unit 12d, a coordinate range reference value storage unit 12e, the image & coordinate range file storage unit 12f, and a work area 12g.

The display data storage unit 12b stores, as data of the bitmap format, display data to be displayed on the color display unit 17.

The image file storage unit 12c stores, in correspondence with file names A, B, . . . , a plurality of sets of image data obtained by high-speed continuous shooting (or moving image shooting) of, for example, a moving object by a digital camera (not shown). Each of image files A, B, . . . is associated with the time interval T of high-speed continuous shooting (or one frame of moving image shooting) which has been received from the digital camera together with the image file.

The moving object coordinate list storage unit 12d stores a list of x- and y-coordinates generated based on a composite image of continuously shot images selectively read out from the image file storage unit 12c. The x- and y-coordinates correspond to positions of a moving object contained in the composite image.

The coordinate range reference value storage unit 12e stores X- and Y-coordinate ranges complying with reference coordinates at a predetermined interval in a composite image of continuously shot images selectively read out from the image file storage unit 12c. The X- and Y-coordinate ranges are generated based on positions of a moving object contained in the composite image.

The image & coordinate range file storage unit 12f stores an image & coordinate range file (FIG. 2) which is generated based on a composite image of continuously shot images selectively read out from the image file storage unit 12c.

FIG. 2 is a table showing an example of the image & coordinate range file stored in the image & coordinate range file storage unit 12f of the PC 10.

The image & coordinate range file storage unit 12f stores, in correspondence with a file name, an extracted image file which is obtained by sampling and extracting image data, including image data important for analysis of a moving object, from a large amount of image data obtained by high-speed continuous shooting or moving image shooting at a shooting time interval Δt set by the user or calculation, the set shooting time interval Δt, a reference X-coordinate range of Xmin to Xmax and Y-coordinate range of Ymin to Ymax corresponding to x- and y-coordinates at a predetermined interval based on moving object images contained in the respective image data of the extracted image file, an X-scale value and Y-scale value added to the reference X- and Y-coordinate ranges, an actually measured value per scale, and layer position correction information (for example, position shift amount Pn(xn,yn) of the start point coordinates of each image while an identical background part in each image Pn is aligned) of each image data using the first image data as a reference when the shooting angles of the respective image data of the extracted image file differ from each other.

In the PC 10 having the above arrangement, the processor (CPU) 11 controls the operations of respective circuit units according to instructions described in the image file generation processing program 12a. Software and hardware operate in cooperation with each other, implementing the image file generation function to be described in the following description of the operation.

Figure 3:
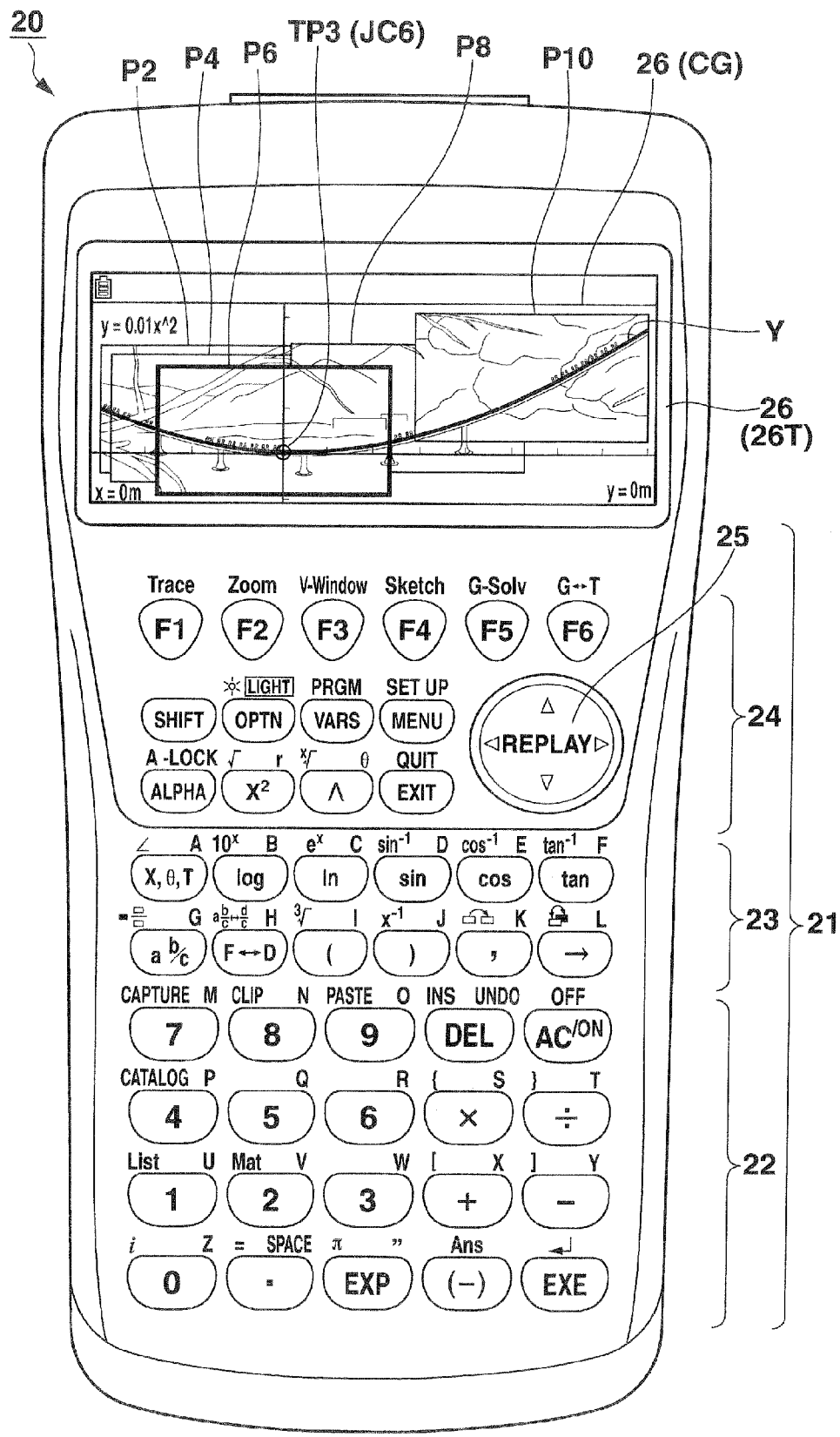
FIG. 3 is a plan view showing the outer appearance of a graph function display device 20 which receives and analyzes, as learning materials, the image & coordinate range file (12f) generated by the image file generation function of the PC 10.

FIG. 3 is a plan view showing the outer appearance of the graph function display device 20 which receives and analyzes, as learning materials, the image & coordinate range file (12f) generated by the image file generation function of the PC 10.

The graph function display device 20 is small in size so that the user can satisfactorily grip it with one hand and operate it with one hand for the sake of portability. A key input unit 21 and color display unit 26 are arranged on the front surface of the main body of the graph function display device 20.

The key input unit 21 includes a numeric•operation symbol key group 22, a function key group 23, a mode setting key group 24, a cursor key 25, and function keys F1 to F6. The numeric•operation symbol key group 22 is used to input numbers and numerical expressions, and designate execution of calculation. The function key group 23 is used to input various functions. The mode setting key group 24 is used to display the menu screens of various operation modes, and designate setting of an operation mode. The cursor key 25 is used to, for example, move a cursor displayed on the color display unit 26 and select a data item. The function keys F1 to F6 are used to selectively designate various functions which are printed on a key panel or menu-displayed along the lower end of the color display unit 26.

As the numeric•operation symbol key group 22, 0 to 9 (numeric) keys, +, −, ×, and ÷ (operation) keys, EXE (execute) key, AC (clear) key, and the like are arrayed.

As the function key group 23, a "log" (logarithm) key, "sin" (sine) key, "ab/c" (fraction) key, and the like are arrayed.

As the mode setting key group 24, a MENU key, SHIFT key, OPTN (option) key, EXIT key, and the like are arrayed.

Note that an inputtable character, symbol, function, or the like is printed on the key panel along the upper edge of each key, and can be input based on a combination of the SHIFT key in the mode setting key group 24 and each corresponding key.

The color display unit 26 is formed from a dot matrix color liquid crystal display unit. A transparent tablet touchpanel 26T for detecting a touch position on the screen is superimposed and arranged on the display screen of the color display unit 26.

The graph function display device 20 has a function of displaying, on the color display unit 26, a graph image composite screen obtained by superimposing a graph Y corresponding to the locus of a moving object in X- and Y-coordinate ranges set based on the shooting interval against the background of a composite image CG acquired by continuous shooting of the moving object.

Figure 4:
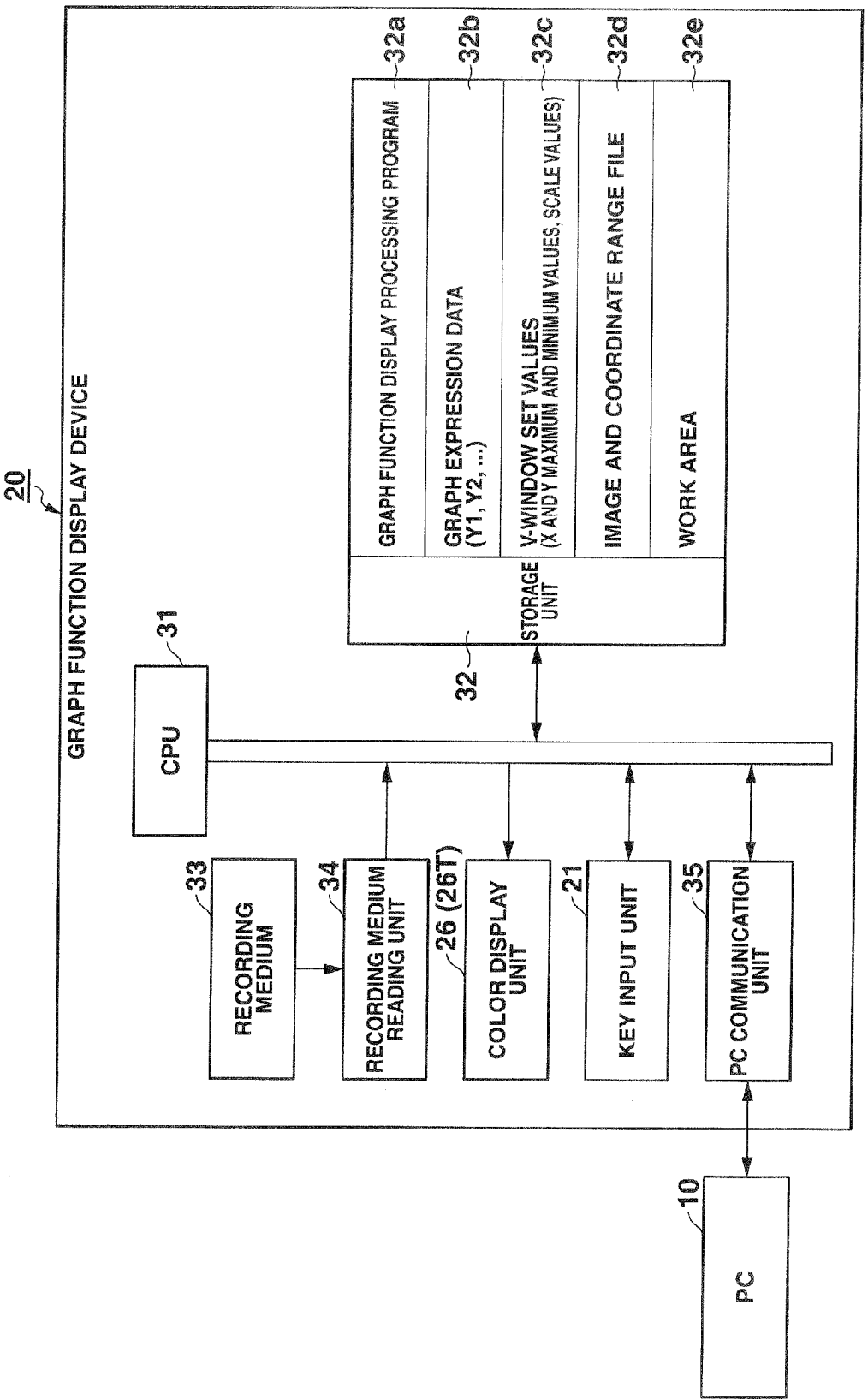
FIG. 4 is a block diagram showing the arrangement of the electronic circuit of the graph function display device 20.

FIG. 4 is a block diagram showing the arrangement of the electronic circuit of the graph function display device 20.

The graph function display device 20 includes a processor (CPU) 31 serving as a computer.

The processor (CPU) 31 controls the operations of respective circuit units according to a graph function display processing program 32a stored in advance in a storage unit (flash ROM) 32, the graph function display processing program 32a loaded from an external recording medium 33 such as a memory card into the storage unit 32 via a recording medium reading unit 34, or the graph function display processing program 32a which is downloaded by a PC communication unit 35 via the external PC 10 from a Web server (program server) on a communication network such as the Internet and is loaded into the storage unit 32. The graph function display processing program 32a stored in the storage unit 32 is activated in accordance with a key input signal from the key input unit 21 or a touch position detection signal from the touchpanel 26T.

The storage unit 32, recording medium reading unit 34, PC communication unit 35, key input unit 21, color display unit (LCD) 26, and touchpanel 26T are connected to the processor (CPU) 31.

The graph function display processing program 32a stored in the storage unit (flash ROM) 32 includes an arithmetic processing program for executing arithmetic processing corresponding to an arbitrary arithmetic expression input by the user via the key input unit 21, a graph drawing processing program for executing graph drawing processing corresponding to an arbitrary function expression input by the user, and a moving object analysis graph display processing program for displaying, as a reference coordinate value or actually measured coordinate value, the relationship between a moving object locus within a composite image obtained by continuous shooting and a graph complying with a reference coordinate range set based on a predetermined shooting interval.

The storage unit 32 includes a graph expression data storage unit 32b, V Window set value storage unit 32c, image & coordinate range file storage unit 32d, and work area 32e.

The graph expression data storage unit 32b stores data of a graph expression input in accordance with a user operation, and data of graph expressions Y1, Y2, . . . calculated based on image analysis.

The V-Window set value storage unit 32c stores coordinate ranges (Xmin to Xmax, and Ymin to Ymax) and their scale values used when displaying a graph on the color display unit 26.

The image & coordinate range file storage unit 32d receives and stores, as learning material data, the image & coordinate range file (12f) generated by the PC 10.

In the graph function display device 20 having the above arrangement, the processor (CPU) 31 controls the operations of respective circuit units according to instructions described in the graph function display processing program 32a. Software and hardware operate in cooperation with each other, implementing a function to be described in the following description of the operation.

In the embodiment, the PC 10 analyzes and edits a large amount of image data obtained by high-speed continuous shooting by a digital camera (not shown). Then, the image & coordinate range file (12f) to be stored in the image & coordinate range file storage unit 32d is received and stored as learning material data in the graph function display device 20. Alternatively, the graph function display device 20 may execute image file generation processing (first embodiment: see FIG. 5) (second embodiment: see FIG. 13), which is originally performed by the PC 10, and generate and store the image & coordinate range file (12f) in the graph function display device 20.

The emulator of the graph function display device 20 may be mounted in the PC 10 to directly supply the image & coordinate range file (12f) generated in the PC 10 into the emulator on the PC 10, and analyze and edit it. In this case, the user can confirm in advance, on the PC 10, a graph image composite screen which is finally analyzed and displayed on the graph function display device 20.

The operations of the PC 10 and graph function display device 20 having the above arrangements will be explained.

First Embodiment

Figure 5:
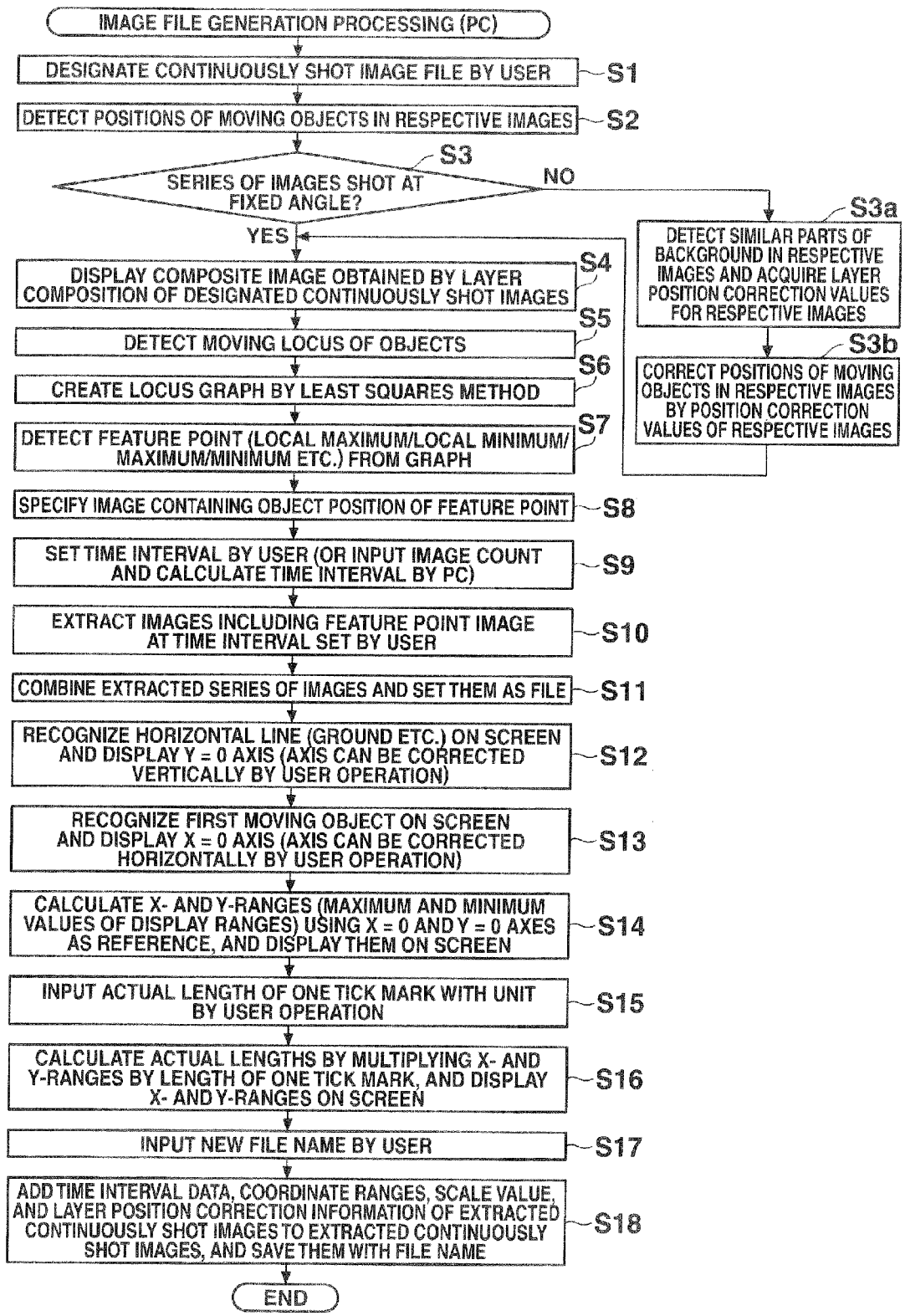
FIG. 5 is a flowchart showing image file generation processing (first embodiment) by the PC 10.

FIG. 5 is a flowchart showing image file generation processing (first embodiment) by a PC 10.

Figure 6A:
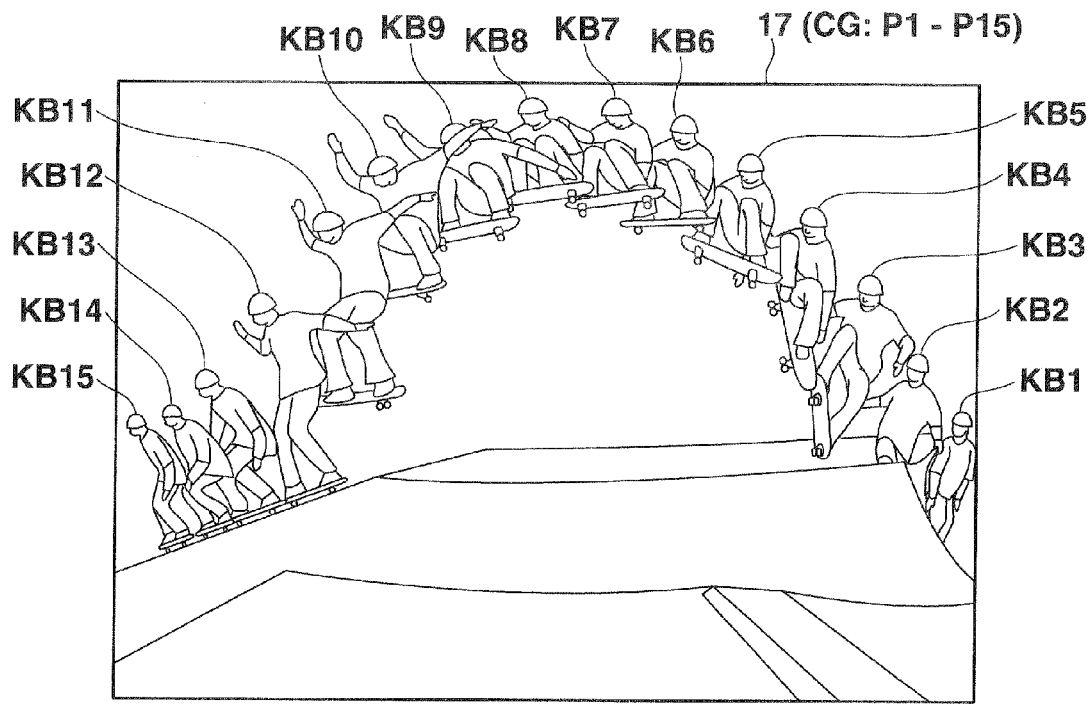
FIG. 6A is a view showing a composite image CG of skateboarder images continuously shot at a fixed angle as targets of the image file generation processing (first embodiment) by the PC 10.

FIG. 6A is a view showing a composite image CG of skateboarder images continuously shot at a fixed angle as targets of the image file generation processing (first embodiment) by the PC 10.

Figure 6B:
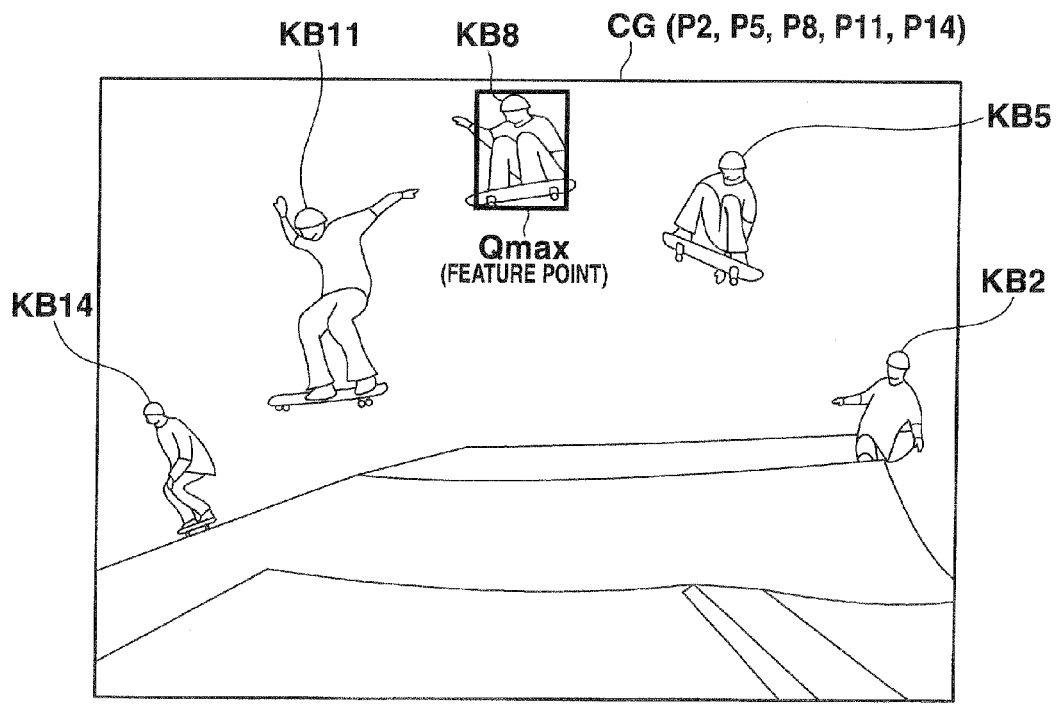
FIG. 6B is a view showing a composite image CG of skateboarder images which are sampled and extracted from the continuously shot skateboarder images at a set interval.
Figure 7A:
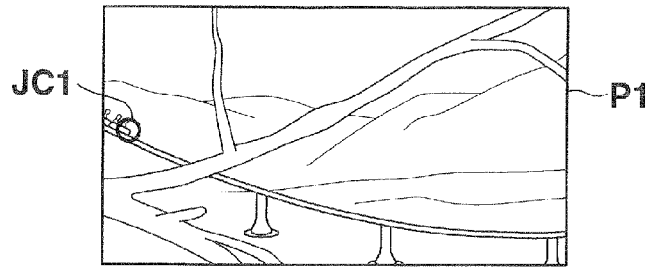
FIGS. 7A, 7B, 7C, 7D, 7E, 7F, 7G, 7H, 7I, and 7J are views showing roller coaster images continuously shot at different angles as targets of the image file generation processing (first embodiment) by the PC 10.
Figure 7B:
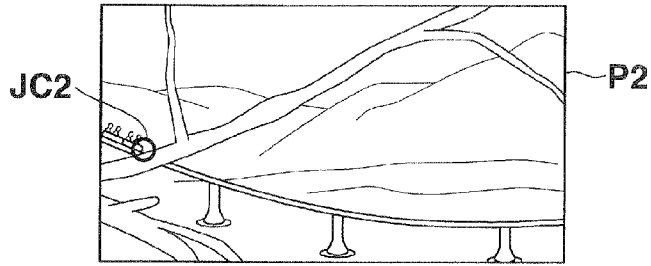
Figure 7C:
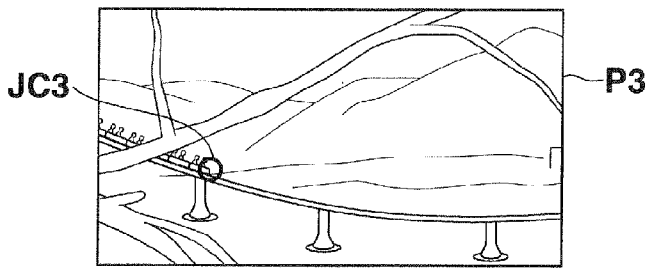
Figure 7D:
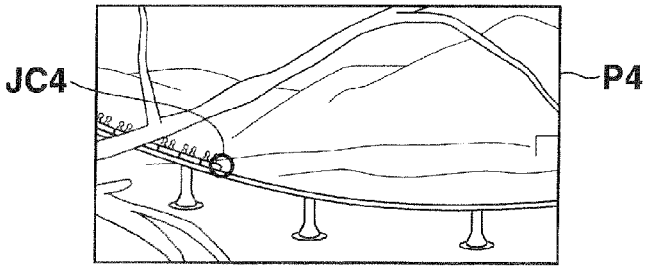
Figure 7E:
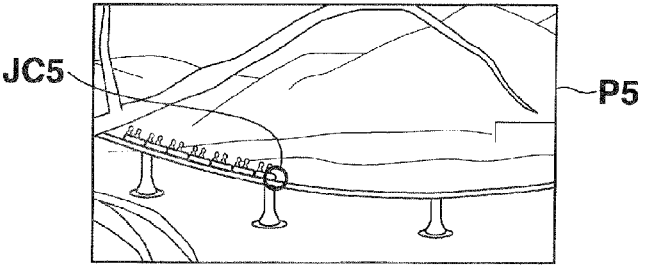
Figure 7F:
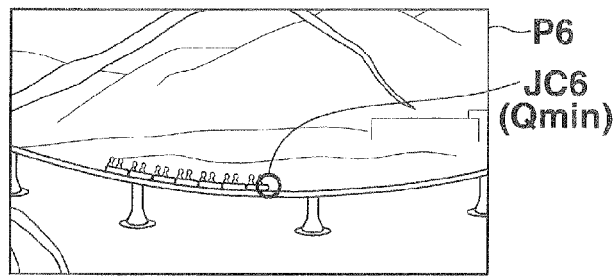
Figure 7G:
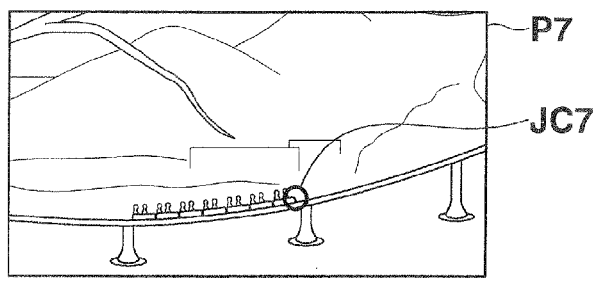
Figure 7H:
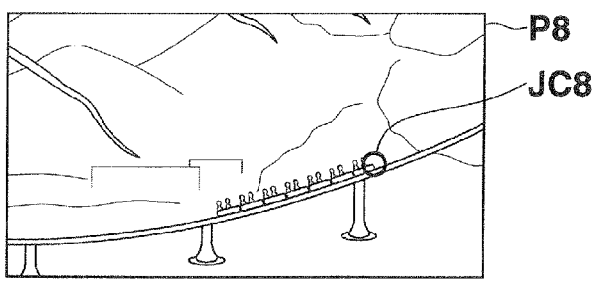
Figure 7I:
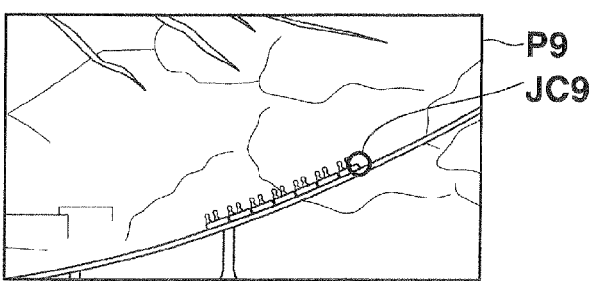
Figure 7J:
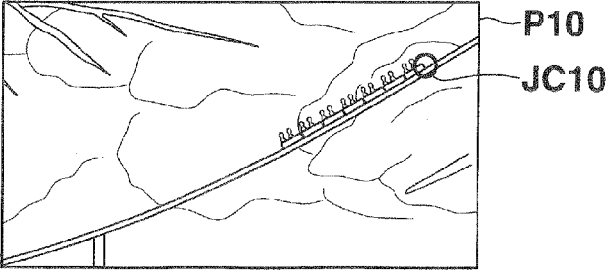

FIG. 6B is a view showing a composite image CG of skateboarder images which are sampled and extracted from the continuously shot skateboarder images at a set interval.

FIGS. 7A, 7B, 7C, 7D, 7E, 7F, 7G, 7H, 7I, and 7J are views showing roller coaster images continuously shot at different angles as targets of the image file generation processing (first embodiment) by the PC 10.

Figure 8:
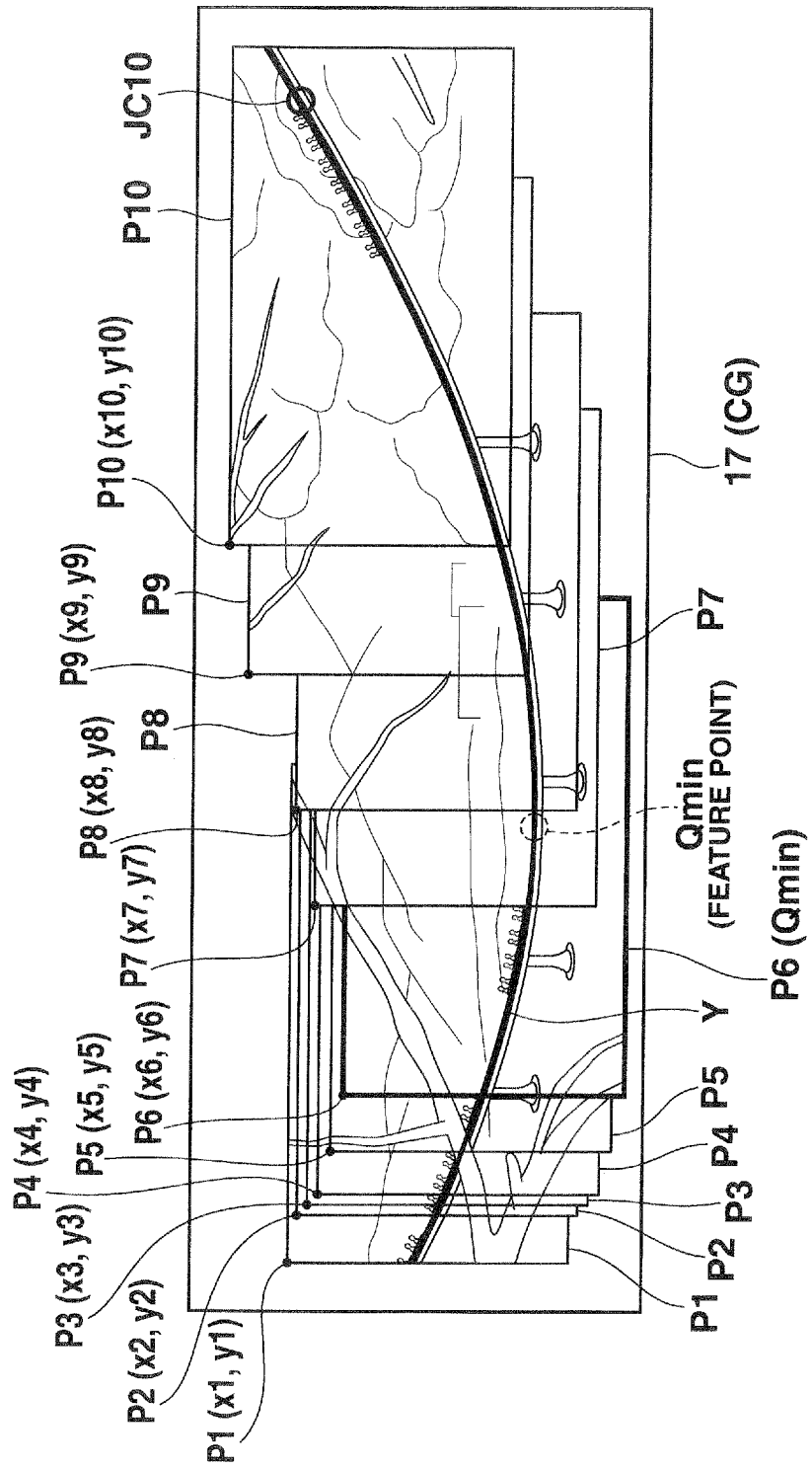
FIG. 8 is a view showing a composite image CG of roller coaster images continuously shot at different angles as targets of the image file generation processing (first embodiment) by the PC 10.

FIG. 8 is a view showing a composite image CG of roller coaster images continuously shot at different angles as targets of the image file generation processing (first embodiment) by the PC 10.

An image file storage unit 12c in the PC 10 stores a plurality of sets of image files A, B, . . . obtained by high-speed continuous shooting (or moving image shooting) of a moving object (for example, a skateboarder or roller coaster) serving as a subject by a digital camera (not shown). Each of image files A, B, . . . is associated with the time interval T of continuous shooting (or one frame of moving image shooting) which has been received from the digital camera together with the image file.

When an image file generation processing program 12a is activated, a display unit 17 displays a file selection screen representing a list of the file names of the respective image files stored in the image file storage unit 12c.

If the user designates an arbitrary image file on the file selection screen (step S1), the positions (x- and y-coordinates in respective images) of moving objects contained in continuously shot images P1, P2, . . . , Pn held in the image file are detected and stored in a moving object coordinate list 12d (step S2).

Whether continuously shot images P1, P2, . . . , Pn held in the designated image file are images shot at a fixed angle is determined by analysis of identical background images and comparison of positions between the respective images (step S3).

If it is determined that continuously shot images P1, P2, . . . , Pn held in the designated image file are images shot at a fixed angle (YES in step S3), for example, the color display unit 17 displays a composite image CG obtained by direct layer composition of continuously shot images P1, P2, . . . , P15 of skateboarders KB1, KB2, . . . , KB15 contained in the designated image file, as shown in FIG. 6A (step S4).

If it is determined that continuously shot images P1, P2, . . . , Pn held in the designated image file are images shot at different angles (NO in step S3), for example, continuously shot images P1, P2, . . . , P10 of roller coasters JC1, JC2, . . . , JC10 contained in the designated image file are aligned by detecting similar parts of the background of the respective images, as shown in FIGS. 7A, 7B, 7C, 7D, 7E, 7F, 7G, 7H, 7I, 7J, and 8. In this state, position shift amounts P2(x2,y2), P3(x3,y3), . . . , P10(x10,y10) of the respective images P2, P3, . . . , P10 using the upper left coordinates P1(x1(=0), y1 (=0)) of the first image P1 as a reference are acquired as layer position correction values (step S3a).

The position coordinates of moving objects (roller coasters) JC1, JC2, . . . , JC10 in the respective images P1, P2, . . . , P10 stored in the moving object coordinate list 12d are corrected by the corresponding layer position correction values P2(x2,y2), P3(x3,y3), . . . , P10(x10,y10) (step S3b).

Then, as shown in FIG. 8, the color display unit 17 displays a composite image CG obtained by layer composition after correcting the positions of continuously shot images P1, P2, . . . , P10 of the roller coasters contained in the designated image file in accordance with the layer position correction values P2(x2,y2), P3(x3,y3), . . . , P10(x10,y10) of the respective images P2, P3, . . . , P10 based on the first image P1 (step S4).

In this manner, the composite image CG is displayed as shown in FIG. 6A for the image file (P1 to P15) obtained by continuous shooting at a fixed angle. For the image file (P1 to P10) obtained by continuous shooting at different angles, the composite image CG is displayed as shown in FIG. 8. After that, the locus of moving objects KB1 to KB15 (JC1 to JC10) on the composite image CG is detected (step S5).

A graph Y corresponding to the detected locus of moving objects KB1 to KB15 (JC1 to JC10) is created by the least squares method, and displayed as a composite image (step S6).

Then, a feature point (for example, local maximum, local minimum, maximum, or minimum) on the graph Y corresponding to the locus of moving objects KB1 to KB15 (JC1 to JC10) is detected (step S7). A continuously shot image Pm containing a moving object corresponding to the feature point is specified (step S8).

More specifically, for the composite image CG of moving objects KB1 to KB15 shown in FIG. 6A, image P8 containing moving object KB8 corresponding to a local maximum feature point Qmax is specified, as shown in FIG. 6B. For the composite image CG of moving objects JC1 to JC10 shown in FIG. 8, image P6 (FIG. 7F) containing moving object JC6 corresponding to a local minimum feature point Qmin is specified (steps S7 and S8).

A shooting time interval Δt (>T) at which continuously shot images P1, P2, . . . , Pn for the composite image are to be acquired as learning material data is set in accordance with a user operation. Alternatively, an image count N (<n) by which continuously shot images P1, P2, . . . , Pn for the composite image are to be acquired as learning material data is set in accordance with a user operation. In this case, the shooting time interval Δt [=(n/N)×T] is set by multiplying, by the continuous shooting time interval T, a value obtained by dividing the total image count n of continuously shot images P1 to Pn by the designated image count N (step S9).

Then, images at the set shooting time interval Δt, including the specified feature point-correspondent image Pm, are extracted from continuously shot images P1, P2, . . . , Pn of the designated image file (step S10). The extracted images are stored as a series of image files in an image & coordinate range file storage unit 12f (FIG. 2) (step S11).

More specifically, the designated image file contains continuously shot images P1 to P15 of the skateboarders (moving objects) KB1 to KB15 shown in FIG. 6A (continuous shooting time interval T=0.1 s), and the shooting time interval Δt at which images are acquired as learning material data is set to 0.3 s (image count N=5). In this case, images P2, P5, P8, P11, and P14 at the set shooting time interval Δt=0.3 s, including image P8 of moving object KB8 corresponding to the specified local maximum feature point Qmax, are extracted. Images P2, P5, P8, P11, and P14 are stored as a file of a series of images together with the shooting time interval Δt=0.3 s in the image & coordinate range file storage unit 12f (FIG. 2) (steps S9 to S11).

Also, the designated image file contains continuously shot images P1 to P10 of the roller coasters (moving objects) JC1 to JC10 shown in FIGS. 7A, 7B, 7C, 7D, 7E, 7F, 7G, 7H, 7I, and 7J (continuous shooting time interval T=0.2 s), and the shooting time interval Δt at which images are acquired as learning material data is set to 0.4 s (image count N=5). In this case, images P2, P4, P6, P8, and P10 at the set shooting time interval Δt=0.4 s, including image P6 of moving object JC6 corresponding to the specified local minimum feature point Qmin, are extracted. Images P2, P4, P6, P8, and P10 are stored as a file of a series of images together with the shooting time interval Δt=0.4 s in the image & coordinate range file storage unit 12f (FIG. 2) (steps S9 to S11).

Thereafter, a horizontal line such as the ground or floor contained in the displayed composite image CG (FIG. 6A or 8) is recognized, and an X-axis (not shown) using the recognized horizontal line as Y=0 is displayed (step S12). Note that the X-axis setting position (Y=0) can be corrected by moving it to an arbitrary vertical position in accordance with a user operation.

Further, the first moving object KB1 (JC1) is recognized among moving objects KB1 to KB15 (JC1 to JC10) contained in the displayed composite image CG (FIG. 6A or 8), and a Y-axis (not shown) using the position of the recognized moving object KB1 (JC1) as X=0 is displayed (step S13). Note that the Y-axis setting position (X=0) can be corrected by moving it to an arbitrary horizontal position in accordance with a user operation. For example, the Y-axis setting position (X=0) may be moved and set to the position of moving object KB8 (JC6) corresponding to the feature point Qmax (Qmin) detected in step S7 (FIG. 10C).

Respective positions obtained by dividing the X-axis at a preset width are defined as the reference tick marks of the X-axis. An X-coordinate range (XSmin to XSmax) and Y-coordinate range (YSmin to YSmax) converted based on the reference Lick marks are displayed (step S14).

An actually measured length (for example, 5 m) per tick mark of the X-axis is input in accordance with a user operation (step S15). Then, an actually measured X-coordinate range (XRmin to XRmax) and actually measured Y-coordinate range (YRmin to YRmax) converted based on the input actually measured value ($\Delta x=5$ m) per tick mark of the X-axis are displayed (step S16).

In this way, the composite image CG of the image file of continuously shot moving objects KB1 to KB15 (JC1 to JC10) is displayed. In addition, the reference X- and Y-coordinate ranges (XSmin to XSmax, and YSmin to YSmax), and the actually measured X- and Y-coordinate ranges (XRmin to XRmax, and YRmin to YRmax) are displayed. In this state, a new file name "skateboard.g3m" (coaster.g3m) is input in accordance with a file save operation (step S17).

The shooting time interval $\Delta t=0.3$ s (0.4 s), the reference X- and Y-coordinate ranges XSmin to XSmax, and YSmin to YSmax, the reference tick mark scale value 1, and the actually measured value ($\Delta x=5$ m) are added to images P2, P5, P8, P11, and P14 (P2, P4, P6, P8, and P10) which have been sampled and extracted from the designated continuously shot images P1 to P15 (P1 to P10) according to the processes of steps S7 to S11. If the images are the extracted images (P2, P4, P6, P8, and P10) continuously shot at different shooting angles, they are associated with the input file name "skateboard.g3m" (coaster.g3m) together with the pieces of layer position correction information P2(x2,y2), P4(x4,y4), ..., P10(x10,y10) which have been acquired in step S3a and correspond to the respective images, and then saved in the image & coordinate range file storage unit 12f (FIG. 2) (step S18).

Data of the image & coordinate range file (12f) stored in the image & coordinate range file storage unit 12f of the PC 10 are output and transferred to a graph function display device 20 via an external device communication unit 15. The data are stored in an image & coordinate range file storage unit 32d of the graph function display device 20 (FIG. 2).

Figure 9:
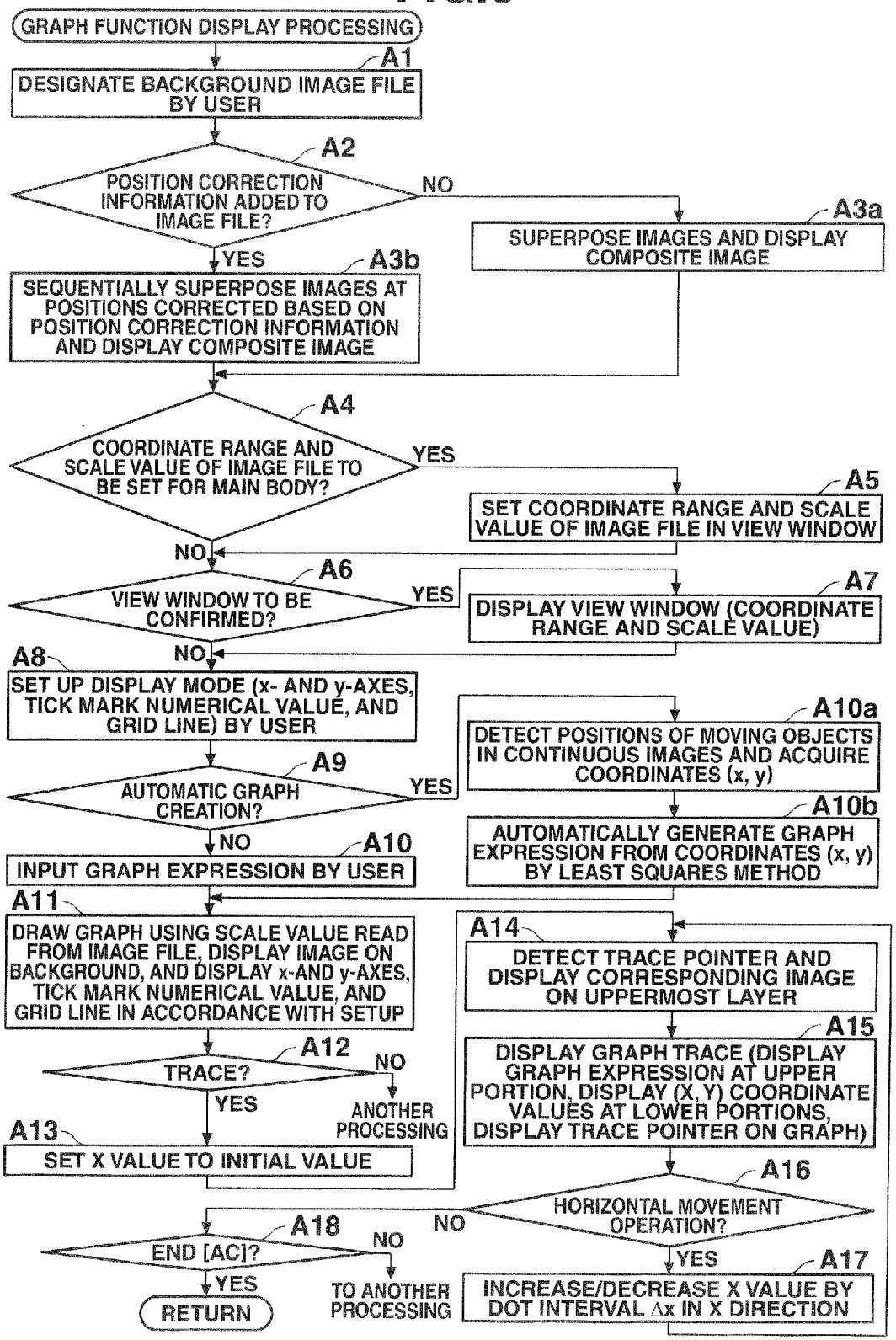
FIG. 9 is a flowchart showing graph function display processing by the graph function display device 20.

FIG. 9 is a flowchart showing graph function display processing by the graph function display device 20.

FIGS. 10A, 10B, 10C, and 10D are views showing an example (No. 4) of an analysis display operation targeting the extracted continuously shot images P2, P4, P6, and P10 of roller coaster images in the graph function display processing by the graph function display device 20.

A graph display mode is set in accordance with a user operation via the MENU key. Then, a color display unit 26 displays an image file selection screen (not shown) representing a list of the file names stored in the image & coordinate range file storage unit 32d (FIG. 2).

If the user designates the file name "coaster.g3m" on the image file selection screen and operates the EXE key (step A1), it is determined whether pieces of layer position correction information are added to the extracted continuously shot images (P2, P4, P6, P8, and P10) which are stored in the image & coordinate range file storage unit 32d (FIG. 2) in correspondence with the designated file name "coaster.g3m." (step A2).

If it is determined that pieces of layer position correction information P2 (x2,y2), P4(x4,y4), ..., P10 (x10,y10) are added to the designated extracted continuously shot images (P2, P4, P6, P8, and P10) (YES in step A2), a composite image CG (FIG. 10D) is generated by sequentially superimposing the extracted continuously shot images (P2, P4, P6, P3, and P10) as display data while correcting their positions in accordance with the corresponding pieces of layer position correction information P2(x2,y2), P4(x4,y4), ..., P10(x10, y10). The color display unit 26 displays the composite image CG (step A3b). At this time (FIG. 10D), none of the graph Y, the graph expression y=f(x), a trace pointer TPn, and the x- and y-coordinates of trace pointer TPn is displayed.

If the user designates the file name "skateboard.g3m" on the image file selection screen (step A1), it is determined that no layer position correction information is added to the designated extracted continuously shot images (P2, P5, P8, P11, and P14) (NO in step A2). As shown in FIG. 6B, a composite image CG is generated by sequentially superimposing the extracted continuously shot images (P2, P5, P8, P11, and P14) as display data. The color display unit 26 displays the composite image CG (step A3a).

Figure 10A:
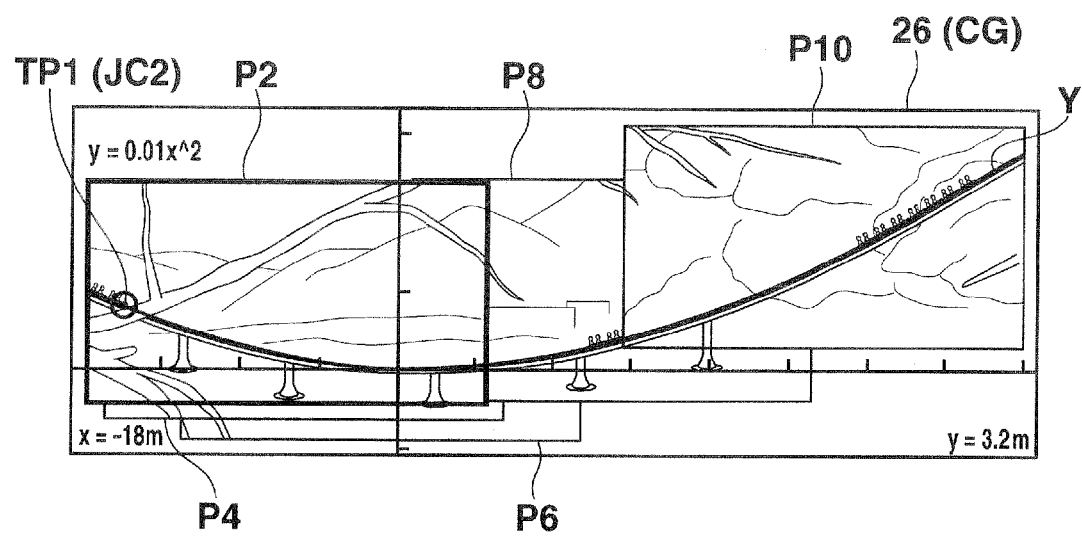
FIGS. 10A, 10B, 10C, and 10D are views showing an example (No. 1) of an analysis display operation targeting extracted continuously shot images P2, P4, P6, and P10 of roller coaster images in the graph function display processing by the graph function display device 20.
Figure 10B:
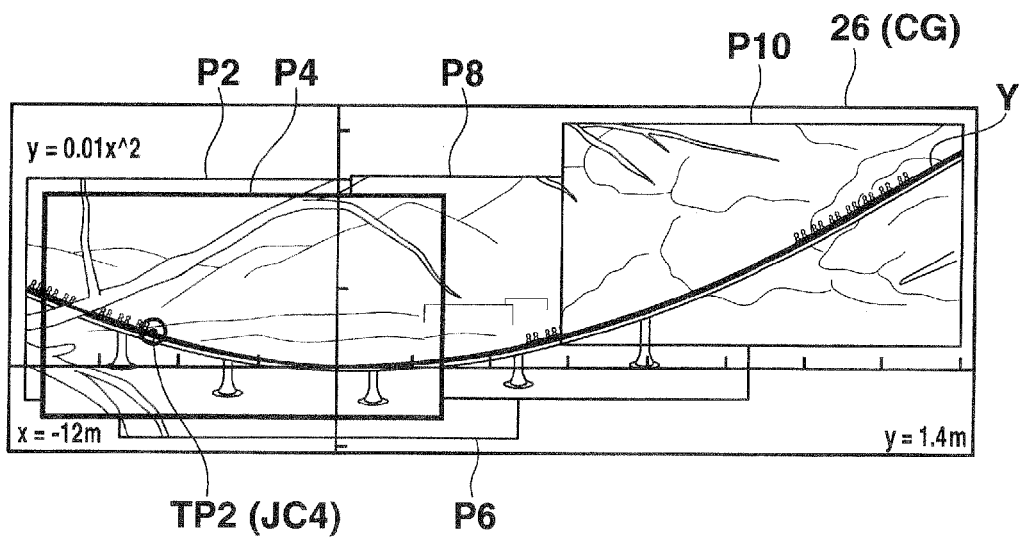
Figure 10C:
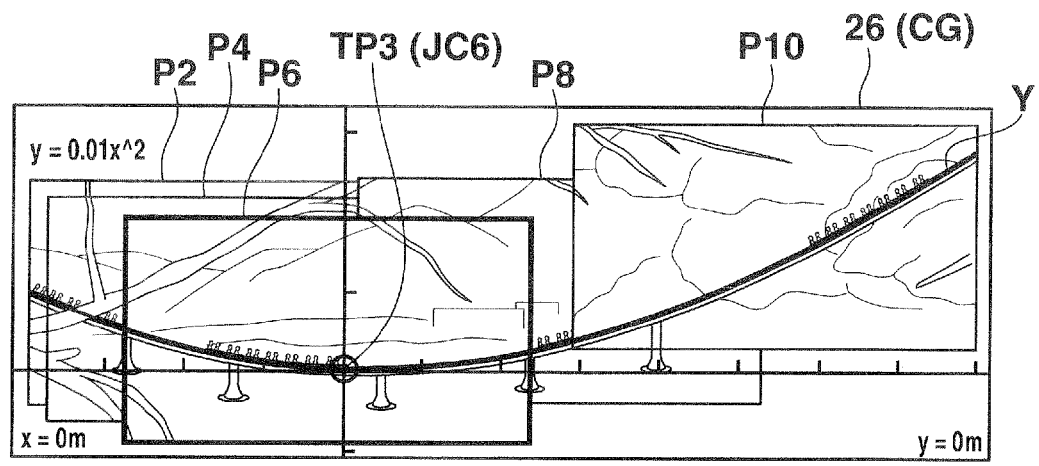
Figure 10D:
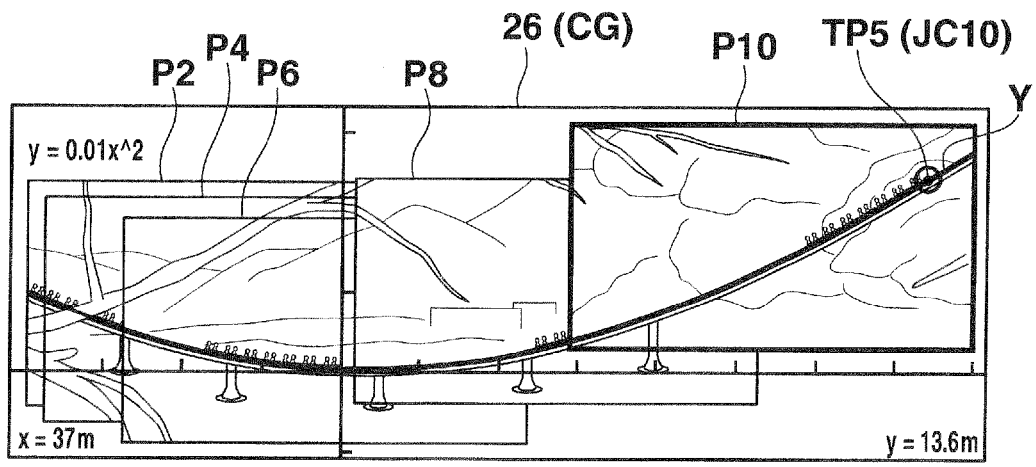

For example, if the display unit 26 displays the composite image CG of the extracted continuously shot images (P2, P4, P6, P8, and P10) upon designation of the file name "coaster.g3m" (FIG. 10D: none of the graph Y, the graph expression y=f(x), trace pointer TPn, and the x- and y-coordinates of trace pointer TPn is displayed) (steps A1 to A3b), a message appears to prompt the user to determine whether to set coordinate ranges [reference X- and Y-coordinate ranges (XSmin to XSmax, and YSmin to YSmax.)] corresponding to the designated file name "coaster.g3m" and the reference tick mark scale value 1 for graph display on the main body of the graph function display device 20. If the user designates setting for the main body (YES in step A4), the coordinate ranges and scale value of this image file are stored and set in a V-Window set value storage unit 32c (step A5).

If the user designates confirmation of V-Window set values by operating the SHIFT key+F3 (V-Window) key (YES in step A6), the coordinate ranges and scale value which are stored and set in the V-Window set value storage unit 32c are read out, and displayed for confirmation as a V-Window setting screen (not shown) (step A7).

In accordance with a user operation, it is set whether to display (presence/absence) x and y-coordinate axes, tick mark numerical values, and a grid line on the graph display screen in the graph display mode (step A8). Then, a message window [automatic graph creation: ON/OFF] appears to prompt the user to select whether to automatically create a graph (step A9).

If the user selects OFF in accordance with the message window [automatic graph creation: ON/OFF] (NO in step A9), the user inputs and displays a graph expression y=f(s) corresponding to the locus (orbit) of moving objects (roller coasters) JC2, JC4, JC6, JC8, and JC10 in the displayed composite image CG (FIG. 10D: none of the graph Y, the graph expression y=f(x), trace pointer TPn, and the x- and y-coordinates of trace pointer TPn is displayed) (step A10).

If the user selects ON in accordance with the message window [automatic graph creation: ON/OFF] (YES in step A9), the positions of moving objects (roller coasters) JC2, JC4, JC6, JC8, and JC10 in the displayed composite image CG (FIG. 10D: none of the graph Y, the graph expression y=f(x), trace pointer TPn, and the x- and y-coordinates of trace pointer TPn is displayed) are detected, and corresponding coordinates (x, y) are acquired (step A10a). A graph expression [y=0.01x$^2$] complying with the locus (orbit) is automatically generated by the least squares method based on the coordinates JC2(x,y), JC4(x,y), . . . , JC10(x,y) of moving objects (roller coasters) JC2, JC4, JC6, JC8, and JC10, and is displayed (step A10b).

Then, as shown in FIG. 10D, the composite image CG on which the graph Y is drawn displayed in accordance with the coordinate ranges [reference X- and Y-coordinate ranges (XSmin to XSmax, and YSmin to YSmax)] and the reference tick mark scale value 1 which are stored and set in the V-Window set value storage unit 32c, and the setting contents of the presence/absence of the x- and y-coordinate axes, the presence/absence of tick mark numerical values, and the presence/absence of the grid line (step A11).

As a result, the extracted continuously shot images P2, P4, P6, P8, and P10 of the file name "coaster.g3m" in the image & coordinate range file (32d) received as learning material data from the PC 10, and the graph Y corresponding to the locus of moving objects (roller coasters) JC2, JC4, JC6, JC8, and JC10 can be displayed to overlap the x- and y-coordinates of reference tick mark values.

In this fashion, the extracted continuously shot images P2, P4, P6, P8, and P10 of the file name "coaster.g3m", and the graph Y corresponding to the locus of moving objects (roller coasters) JC2, JC4, JC6, JC8, and JC10 are displayed to overlap the composite image CG based on the reference x- and y-coordinates. In this state, if the user designates graph tracing of the graph Y by operating the SHIFT key+F1 (Trace) key (YES in step A12), the x-value of the trace pointer TP is set to an initial value (x=0 in this case) (step A13).

Then, a trace pointer TP3 matching moving object JC6 corresponding to the initial value (x=0) on the graph Y is detected, as shown in FIG. 10C. Image P6 corresponding to trace pointer TP3 is displayed on the uppermost layer in the composite image CG (step A14).

Trace pointer TP3 (matching moving object JC6) corresponding to the initial value x=0 is displayed on the graph Y, and the graph expression [y=0.01x$^2$] is displayed at an upper portion on the screen. Further, the actually measured x- and y-coordinate values (x=0 m, y=0 m) of trace pointer TP3 converted based on the actually measured value Δx=5 m stored in the image & coordinate range file storage unit 32d are displayed at lower portions on the screen (step A15).

If the user designates movement of trace pointer TPn to left (←) or right (→) by operating the cursor key 25 (YES in step A16), the x-value of trace pointer TPn is increased/decreased by a predetermined dot interval Δx (=1 to 3 dots) in the X direction every time the pointer movement is designated (step A17).

As shown in FIG. 10A, a trace pointer TP1 (matching moving object JC2) after changing the x-value on the graph Y is detected. Image P2 corresponding to trace pointer TP1 is displayed on the uppermost layer in the composite image CG (step A14).

Trace pointer TP1 (matching moving object JC2) after changing the x-value on the graph Y is displayed. The actually measured x- and y-coordinate values (x=−18 m, y=3.2 m) of trace pointer TP1 converted based on the actually measured value Δx=5 m are similarly updated and displayed (step A15).

If the user designates movement of trace pointer TPn to right and the x-value is increased (step A16→A17), a trace pointer TP2 (matching moving object JC4) after changing the x-value on the graph Y is detected, as shown in FIG. 10B. Image P4 corresponding to trace pointer TP2 is displayed on the uppermost layer in the composite image CG (step A14).

Trace pointer TP2 (matching moving object JC4) after changing the x-value on the graph Y is displayed. The actually measured x- and y-coordinate values (x=−12 m, y=1.4 m) of trace pointer TP2 converted based on the actually measured value Δx=5 m are similarly updated and displayed (step A15).

Also, if the user designates movement of trace pointer TPn to right and the x-value is increased (step A16→A17), a trace pointer TP5 (matching moving object JC10) after changing the x-value on the graph Y is detected, as shown in FIG. 10D. Image P10 corresponding to trace pointer TP5 is displayed on the uppermost layer in the composite image CG (step A14).

Trace pointer TP5 (matching moving object JC10) after changing the x-value on the graph Y is displayed. The actually measured x- and y-coordinate values (x=37 m, y=13.6 m) of trace pointer TP5 converted based on the actually measured value Δx=5 m are similarly updated and displayed (step A15).

If the user designates the end by operating the AC key (YES in step A18), the series of graph function display processing ends.

Figure 13:
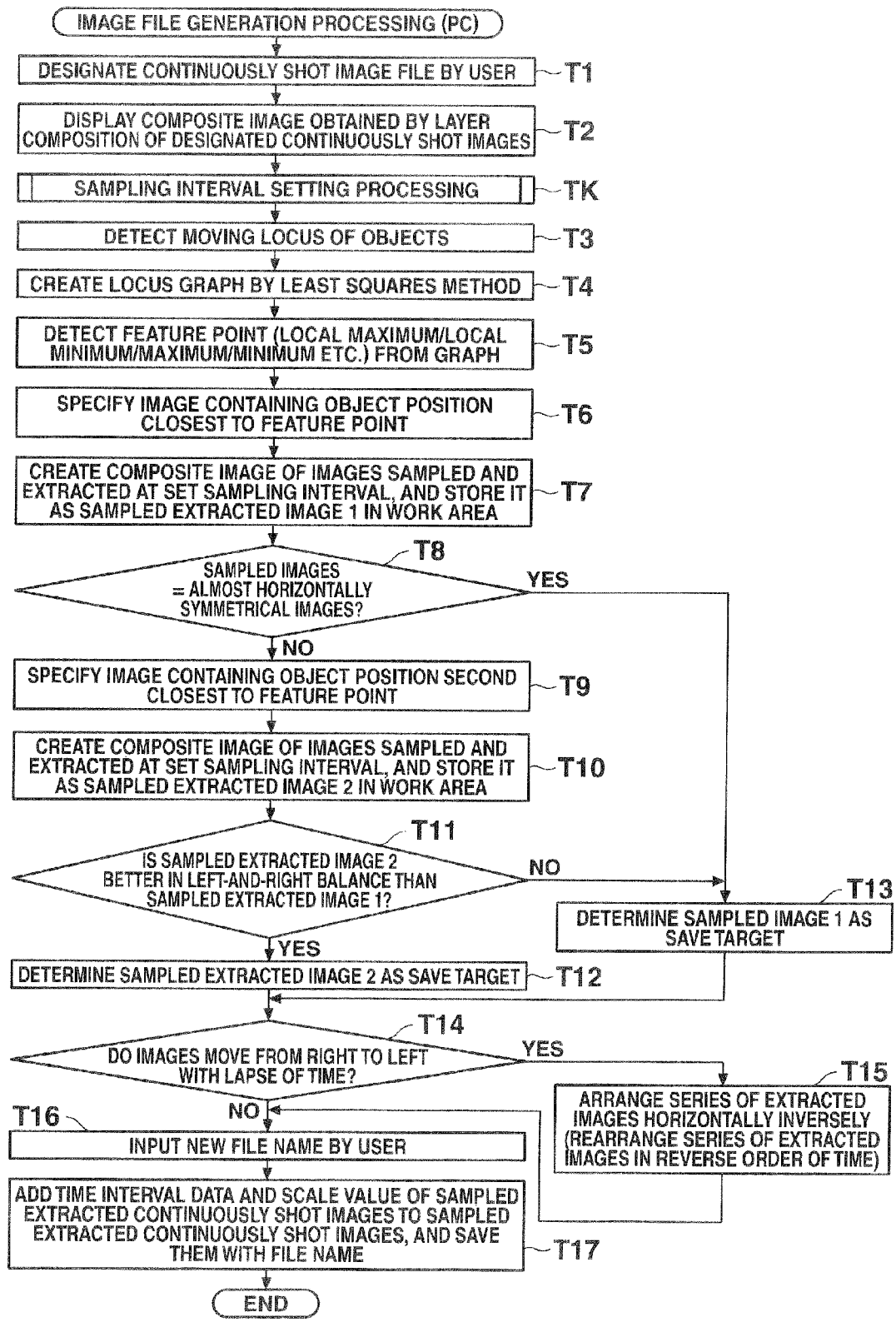
FIG. 13 is a flowchart showing image file generation processing (second embodiment) by the PC 10.

As described above, the graph function display device 20 may execute all processes including the image file generation processing executed by the PC 10 (first embodiment: see FIG. 5) (second embodiment: see FIG. 13). In this case, the graph function display device 20 directly receives and processes various image files obtained by high-speed continuous shooting by a digital camera (not shown).

According to the image file generation function (first embodiment) targeting high-speed continuously shot images of a moving object by the PC 10 having the above arrangement, a composite image CG of image data P1 to Pn obtained by high-speed continuous shooting (shooting time interval T) of a moving object is generated. The positions (x- and y-coordinates) of moving objects KB1 to KB15 (JC1 to JC10) on the composite image CG are detected. Based on the positions, the locus of movement Y of moving objects KB1 to KB15 (JC1 to JC10) is detected. Image data P8 (P6) corresponding to the feature point Qmax (Qmin) of the locus of movement Y of moving objects KB1 to KB15 (JC1 to JC10) is specified. Image data corresponding to the shooting time interval Δt which is set by the user and is longer than the shooting time interval T of high-speed continuous shooting, including the specified image data P8 (P6), are extracted from image data P1 to Pn of high-speed continuous shooting. The extracted image data are stored as the extracted continuously shot image file of P2, P5, P8, P11, and P14 (P2, P4, P6, P8, and P10) in the image & coordinate range file storage unit 12f in correspondence with the set shooting time interval Δt. The image & coordinate range file (12f) is output and transferred as learning material data to the graph function display device 20. A composite image CG is generated from the extracted continuously shot image file of P2, P5, P8, P11, and P14 (P2, P4, P6, P8, and P10). A graph Y corresponding to the locus of movement of moving objects KB2, KB5, KB8, KB11, and KB14 (JC2, JC4, JC6, JC8, and JC10) is generated and analyzed.

Images can be appropriately extracted from a series of continuously shot images/moving image obtained by shooting a moving object. Effective learning materials can therefore be generated.

According to the image file generation function (first embodiment) targeting high-speed continuously shot images of a moving object by the PC 10 having the above arrangement, when image data P1 to Pn obtained by high-speed continuous shooting (shooting time interval T) are image data P1 to P10 shot at different angles, pieces of position correction information for image data P2 to P10 are acquired by alignment of similar background images using the first image data P1 as a reference. The positions of image data P1 to P10 are corrected in accordance with the pieces of position correction information, generating a composite image CG. The continuously shot image file of P2, P4, P6, P8, and P10 extracted at the shooting time interval Δt set by the user, including image data P6 corresponding to the feature point Qmin, is stored in the image & coordinate range file storage unit 12f in correspondence with the set shooting time interval Δt and the pieces of position correction information of the extracted image data P2, P4, P6, P8, and P10.

Even when image data P1 to Pn obtained by high-speed continuous shooting are image data P1 to P10 shot at different angles, the extracted continuously shot image file of P2, P4, P6, P8, and P10 can be generated from a proper position-corrected composite image CG. In addition, the graph function display device 20 can generate a proper composite image CG based on the pieces of position correction information in the extracted continuously shot image files. A graph Y corresponding to the locus of movement of moving objects JC2, JC4, JC6, JC8, and JC10 can be generated and analyzed.

Note that the image file generation function (FIG. 5) according to the first embodiment specifies continuously shot image P8 (P6) containing moving object KB8 (JC6) closest to the feature point Qmax (Qmin) on the graph Y corresponding to the locus of moving objects KB1 to KB15 (JC1 to JC10). The image file generation function generates the extracted continuously shot image file of P2, P5, P8, P11, and P14 (P2, P4, P6, P8, and P10) including continuously shot image P8 (P6).

In contrast, as will be described in the second embodiment (FIGS. 15A, 15B, 15C, 155D 15E, 15F, and 15G), a composite image CG (P3, P6, P9, P12, P15, P18, P21, and P24) of an extracted image file including a continuously shot image P12 containing a moving object KT12 closest to the feature point Qmax may be compared with a composite image CG (P1, P4, P7, P10, P13, P16, P19, P22, and P25) of an extracted image file including a continuously shot image P13 containing a moving object KT13 second closest to the feature point Qmax. In this case, the extracted image file of P1, P4, P7, P10, P13, P16, P19, P22, and P25 exhibiting a better balance of moving objects on the left and right sides of the feature point Qmax is determined as a save target. The extracted continuously shot image files which are more effective as learning materials can be crated.

Second Embodiment

FIG. 11 is a view showing the second example of an image & coordinate range file stored in an image & coordinate range file storage unit 12f of a PC 10.

The image & coordinate range file storage unit 12f stores, as original images, a continuously shot image file (file name "ball") obtained by high-speed continuous shooting (or moving image shooting) of moving object (hemisphere in this case) serving as a subject by a digital camera (not shown). The continuously shot image file (original images) is associated with the time interval Δt (=0.1 s) of continuous shooting (or one frame of moving image shooting) which has been received from the digital camera together with the image file (original images).

Note that the continuously shot image file (original images) is an image file selected from image files stored in an image file storage unit 12c.

FIG. 12 is a table showing a recommended sampling interval table 12h which is stored in advance in a storage unit 12 for image file generation processing (second embodiment) by the PC 10.

The recommended sampling interval table 12h sets a recommended sampling interval for sampling the continuously shot image file (original images) at a proper interval corresponding to the continuous shooting speed (continuous shooting time interval Δt) by image file generation processing (second embodiment) which will be exemplified below.

More specifically, the recommended sampling interval table 12h stores a continuous shooting speed (images/sec) selected in accordance with the shooting time interval Δt of the continuously shot image file (original images), a recommended sampling interval (every n images) corresponding to the continuous shooting speed (images/sec), the time interval (T-scale value) between images extracted after sampling of the continuously shot image file (original images) corresponding to the recommended sampling interval, and a continuously shot image count (30 images→? images) after recommended sampling when the continuously shot image file (original images) is formed from 30 image data.

In the recommended sampling interval table 12h, the time interval (T-scale value) between extracted images after sampling of the continuously shot image file (original images) corresponding to the recommended sampling interval is set, excluding a fraction, to [0.2 s] (0.188 . . . s in calculation) for a continuous shooting speed ($\frac{1}{15}$=0.06 . . . s) and a recommended sampling interval (3→1 [every three]), and [0.1 s] (0.099 . . . s in calculation) for a continuous shooting speed ($\frac{1}{30}$=0.03 . . . s) and a recommended sampling interval (3→1 [every three]). For a continuous shooting speed ($\frac{1}{10}$=0.1 s), a recommended sampling interval (3→1 [every three]) is a time interval (T-scale value) [0.3 s] between sampled extracted images. For a continuous shooting speed ($\frac{1}{40}$=0.025 s), a recommended sampling interval (4→1 (every four)) is a time interval (T-scale value) [0.1 s] between sampled extracted images. The time interval (T-scale value) is set excluding a fraction. This simplifies analysis and numerical display of sampled extracted images.

FIG. 13 is a flowchart showing image file generation processing (second embodiment) by the PC 10.

Figure 14:
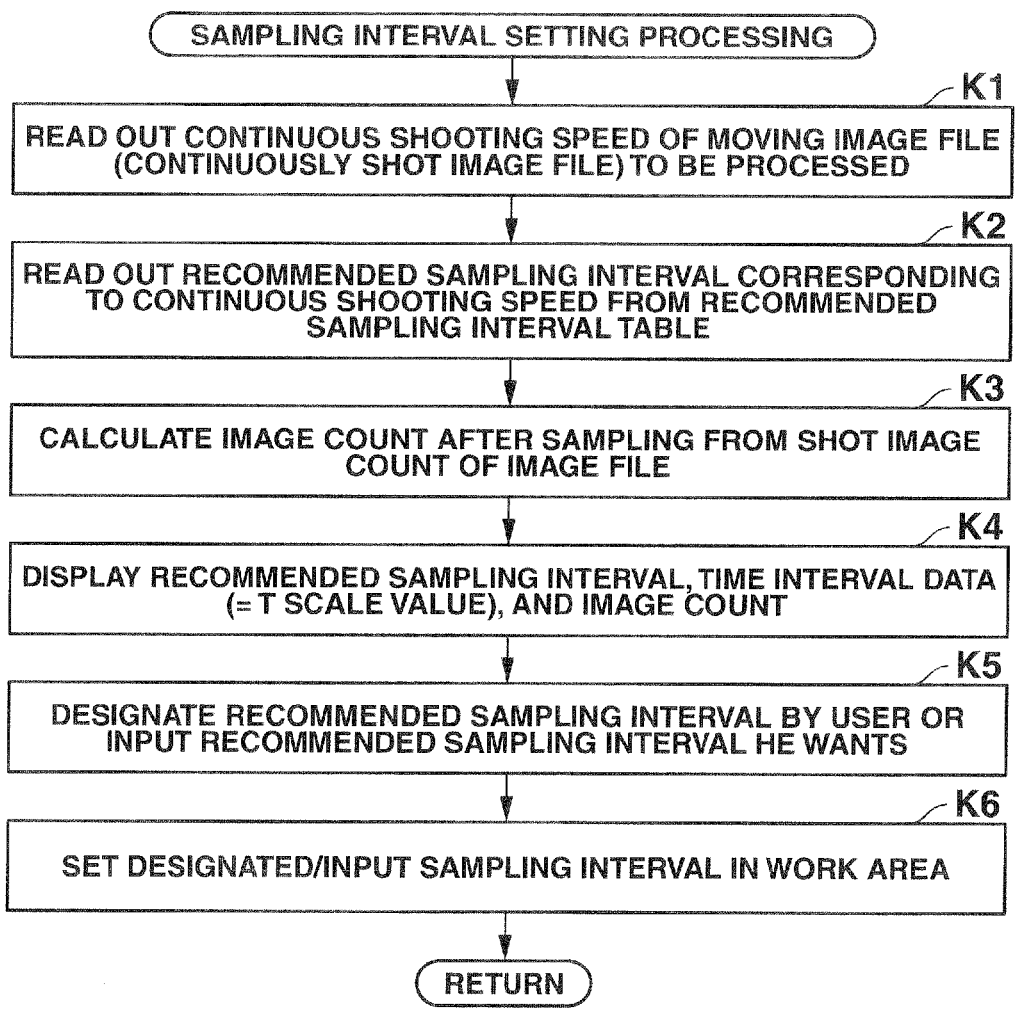
FIG. 14 is a flowchart showing sampling interval setting processing accompanying the image file generation processing (second embodiment) by the PC 10.

FIG. 14 is a flowchart showing sampling interval setting processing accompanying the image file generation processing (second embodiment) by the PC 10.

FIGS. 15, 15B, 15C, 15D, 15E, and 15F are views showing a composite image CG (No. 6) of hemisphere images continuously shot at a fixed angle as targets of the image file generation processing (second embodiment) by the PC 10.

Figure 15A:
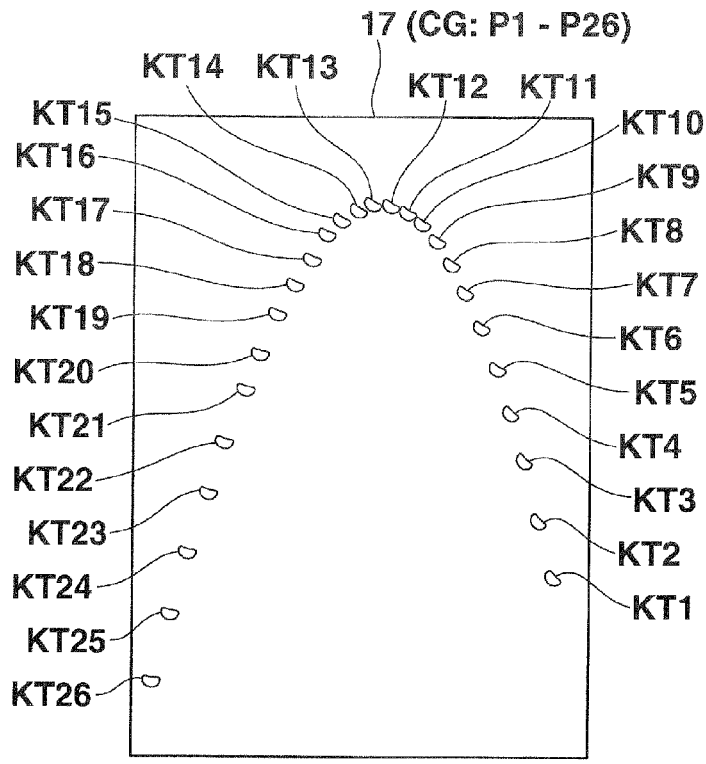
FIGS. 15A, 15B, 15C, 15D, 15E, and 15F are views showing a composite image CG of hemisphere images continuously shot at a fixed angle as targets of the image file generation processing (second embodiment) by the PC 10.
Figure 15B:
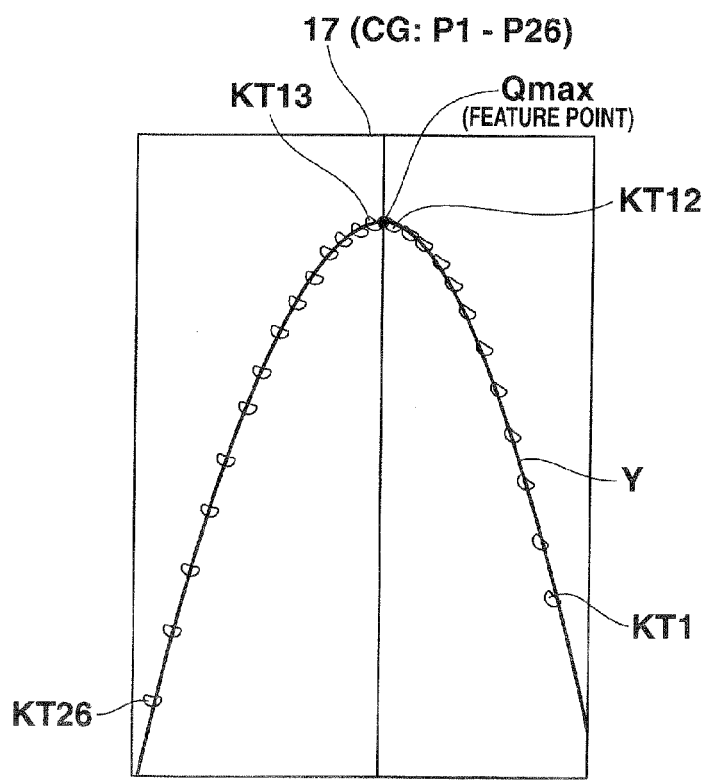
Figure 15C:
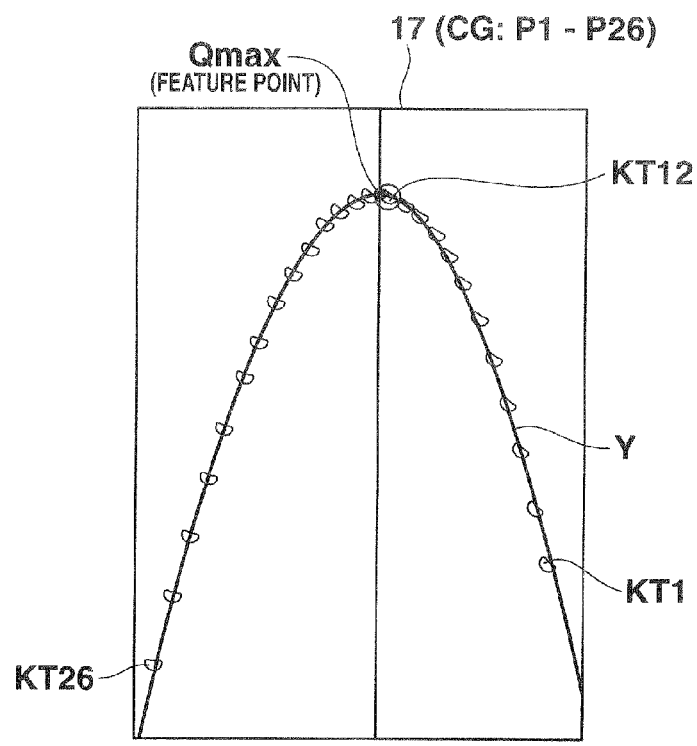
Figure 15D:
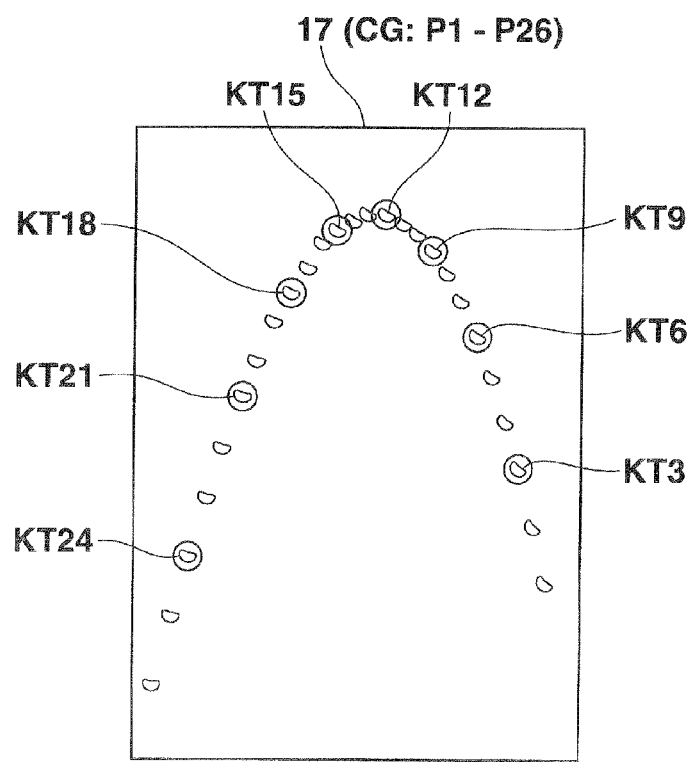
Figure 15E:
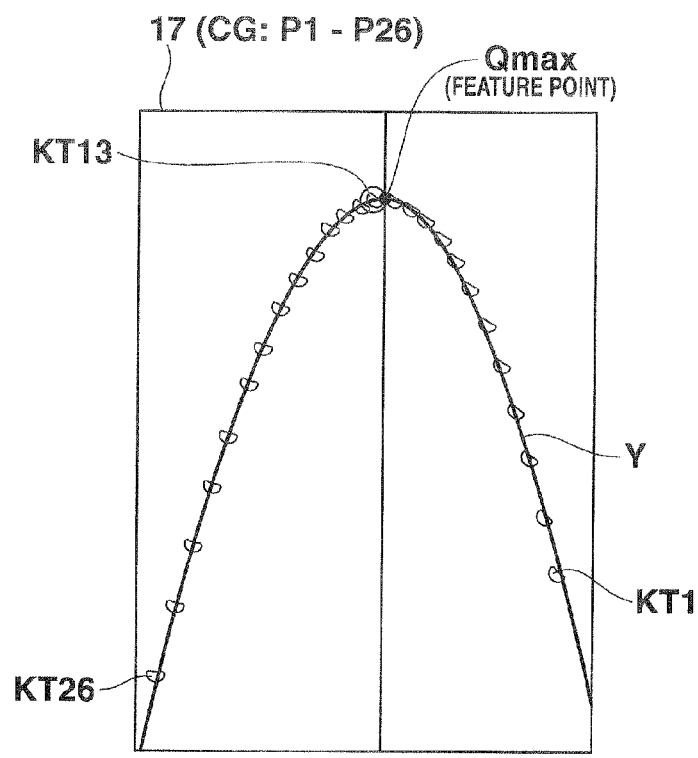
Figure 15F:
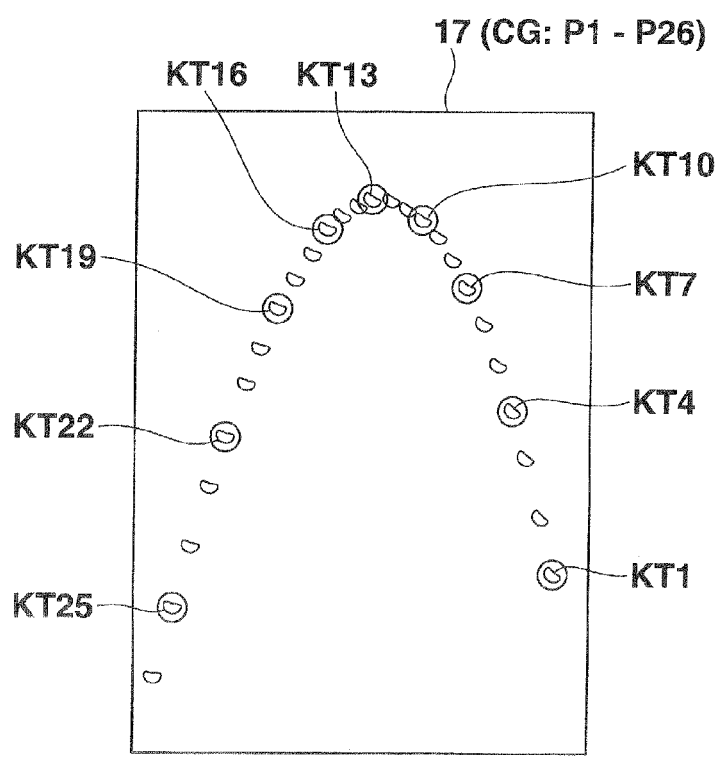
Figure 15G:
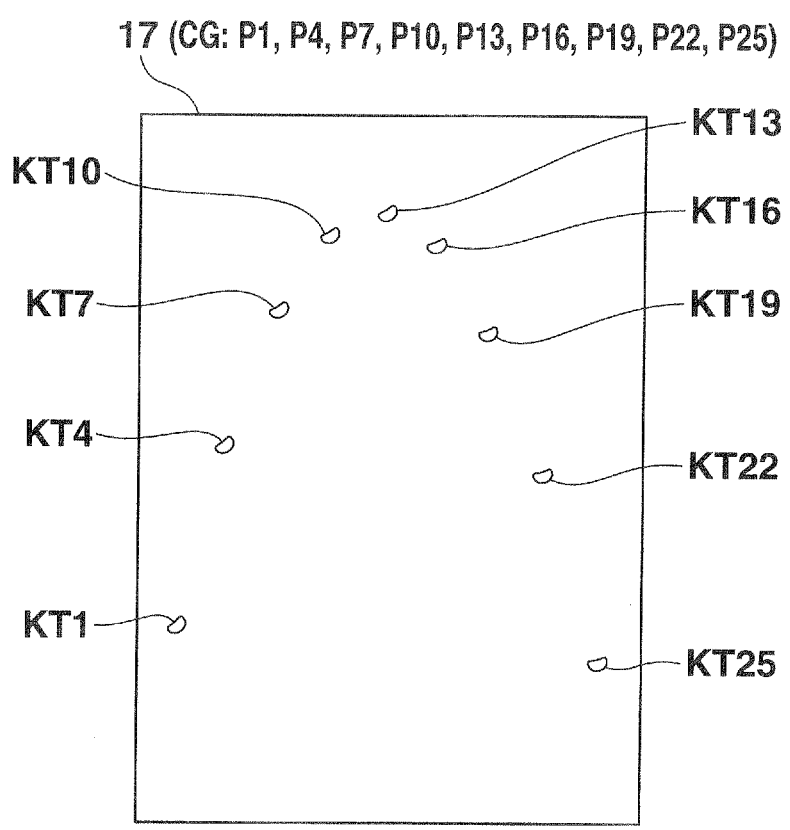
FIG. 15G is a view showing a composite image CG of hemisphere images which are sampled and extracted from the continuously shot hemisphere images at a recommended sampling interval and are horizontally inverted.

FIG. 15G is a view showing a composite image CG of hemisphere images which are sampled from the continuously shot hemisphere images at a recommended sampling interval and are horizontally inverted.

When an image file generation processing program 12a is activated, a display unit 17 displays a file selection screen representing a list of the file names of the respective image files stored in the image file storage unit 12c.

If the user designates an arbitrary image file (the continuously shot image file "ball" (original images)) on the file selection screen, the designated continuously shot image file "ball" (original images) is stored in the image & coordinate range file storage unit 12f (FIG. 11) (step T1).

Then, as shown in FIG. 15A, the color display unit 17 displays a composite image CG obtained by direct layer composition of continuously shot images P1, P2, . . . , P26 of moving objects (hemispheres) KT1, KT2, . . . , KT26 contained in the designated image file "ball" (original images) (step T2). Then, the process shifts to the sampling interval setting processing in FIG. 14 (step TK).

In the sampling interval setting processing, first, a continuous shooting speed (continuous shooting time interval Δt= 0.1 s) corresponding to the designated image file "ball" (original images) to be processed is read out (step K1).

Then, a recommended sampling interval (3→1 [every three]) corresponding to the continuous shooting speed (Δt=0.1 s=1/10) of the image file "ball" (original images) is read out from the recommended sampling interval table 12h (step K2).

An image count after sampling (26÷3=8 with a remainder of 2) is calculated by dividing the shot image count (P1 to P26: 26 images) of the image file "ball" (original images) by the recommended sampling interval (3→1 [every three]) (step K3).

The display unit 17 displays the recommended sampling interval (3→1 [every three]), the time interval (T-scale value=0.3 s), and the image count after sampling (8 with a remainder of 2), and prompts the user to confirm them (step K4).

If the displayed recommended sampling interval (3→1 [every three]) is designated or an arbitrary sampling interval is input in accordance with a user operation (step K5), the designated or input sampling interval is set in a work area 12g (step K6).

After setting the sampling interval (in this case, recommended sampling interval of 3→1 [every three]) for the continuously shot image file "ball" (original images P1 to P26), the locus of moving objects KT1 to KT26 is detected on the composite image CG (FIG. 15A) displayed on the color display unit 17 (step T3).

As shown in FIG. 15B, a graph Y corresponding to the detected locus of moving objects KT1 to KT26 is created by the least squares method, and displayed as a composite image (step T4).

Then, a feature point (for example, local maximum, local minimum, maximum, or minimum) on the graph Y corresponding to the locus of moving objects KT1 to KT26 is detected (step T5). A continuously shot image Pm containing a moving object closest to the feature point is specified (step T6).

Hare specifically, for the composite image PG of moving objects KT1 to KT26 shown in FIG. 15A, image P12 containing moving object KT12 closest to a local maximum feature point Qmax is specified, as shown in FIG. 15C (steps T5 and T6).

Images P3, P6, P9, P12, . . . , P24 sampled, including the specified image P12, from continuously shot images P1, P2, . . . , P26 of the designated image file "ball" (original images) at the set recommended sampling interval (3→1 [every three]) are extracted, generating a composite image CG (FIG. 15D). The composite image CG is stored as sampled extracted image 1 in the work area 12g (step T7).

It is determined whether the positions of moving objects KT3, KT6, KT9, KT12, . . . , KT24 are almost horizontally symmetrical about the feature point Qmax in the composite image CG (FIG. 15D) of the sampled extracted images P3, P6, P9, P12, . . . , P24, including image P12 containing moving object KT12 closest to the feature point Qmax (step T8).

More specifically, horizontal symmetry is determined based on whether the respective positions of moving objects KT15, KT18, KT21, and KT24 on the left side of moving object KT12 closest to the feature point Qmax in the composite image CG (FIG. 15D) and the respective positions of moving objects KT9, KT6, and KT3 on the right side fall within a predetermined allowable range in the Y direction.

It is determined that the positions of moving objects KT3, KT6, KT9, KT12, . . . , KT24 are not horizontally symmetrical about the feature point Qmax in the composite image CG of the sampled extracted images P3, P6, P9, P12, . . . , P24 in FIG. 15D (NO in step T8).

Hence, a continuously shot image Pm containing a moving object second closest to the feature point on the graph Y corresponding to the locus of moving objects KT1 to KT26 is specified (step T9).

More specifically, image P13 containing moving object KT13 second closest to the local maximum feature point Qmax is specified, as shown in FIG. 15E (step T9).

Then, images P1, P4, P7, P10, . . . , P25 sampled, including the specified image P13, from continuously shot images P1, P2, . . . , P26 of the designated image file "ball" (original images) at the set recommended sampling interval (3→1 [every three]) are extracted, generating a composite image PG (FIG. 15F). The composite image CG is stored as sampled extracted image 2 in the work area 12g (step T10).

Horizontal symmetry information of moving objects KT3, KT6, KT9, KT12, . . . , KT24 in sampled extracted image 1 (FIG. 15D) that has been stored in the work area 12g in step T7 is compared with horizontal symmetry information of moving objects KT1, KT4, KT7, KT10, . . . , KT25 in sampled extracted image 2 (FIG. 15F) that has been stored in the work area 12g in step T10. It is determined whether horizontal symmetry of sampled extracted image 2 is higher than that of sampled extracted image 1 (left-and-right balance is better) (step T11).

If it is determined that horizontal symmetry of sampled extracted image 2 is higher than that of sampled extracted image 1 (YES in step T11), sampled extracted image 2 (P1, P4, P7, P10, . . . , P25) is determined as a save target (step T12).

If it is determined in step TB that the positions of moving objects KT3, KT6, KT9, KT12, . . . , KT24 are almost horizontally symmetrical about the feature point Qmax in sampled extracted image 1 (P3, P6, P9, P12, . . . , P24), including image P12 containing moving object KT12 closest to the feature point Qmax (YES in step T8), sampled extracted image 1 is determined as a save target (step T13).

In this case, sampled extracted image 2 (P1, P4, P7, P10, . . . , P25) (FIG. 15F) is determined as a save target according to the processes of steps T8 to T12.

It is determined whether moving objects KT1, KT4, KT7, KT10, . . . , KT25 detected from the composite image CG move from right to left in the order of the respective images P1, P4, P7, P10, . . . , P25 (shooting order) in sampled extracted image 2 (P1, P4, P7, P10, . . . , P25) which has been determined as a save target (step T14).

If it is determined that moving objects KT1, KT4, KT7, KT10, . . . , KT25 move from right to left in the shooting order in sampled extracted image 2 (P1, P4, P7, P10, . . . , P25) (YES in step T14), images P1, P4, P7, P10, . . . , P25 which form sampled extracted image 2 are horizontally inverted and rearranged, as shown in FIG. 15G (step T15).

While displaying the composite image CG of horizontally inverted sampled extracted image 2 (P1, P4, P7, P10, ..., P25), a new file name "ball.g3m" is input in accordance with a file save operation (step T16).

The shooting time interval Δt=0.3 s and the scale value 1 are added to images (sampled extracted continuously shot image 2) P1, P4, P7, P10, ..., P25 which have been sampled and extracted from the designated continuously shot images P1 to P26 and have been horizontally inverted according to the processes of steps T1 to T15. Sampled extracted image 2 is associated with the input file name "ball.g3m", and stored in the image & coordinate range file storage unit 12f (FIG. 11) (step T17).

Data of the image & coordinate range file (12f) stored in the image & coordinate range file storage unit 12f of the PC 10 are output and transferred to a graph function display device 20 via an external device communication unit 15. The composite image CG (P1, P4, P7, P10, ..., P25) is displayed in accordance with the above-described graph function display processing (FIG. 9). An x-y graph Y and t-y graph Yt corresponding to the locus of moving objects KT1, KT4, KT7, KT10, ..., KT25 are displayed, and appropriately analyzed by graph tracing or the like.

Figure 16A:
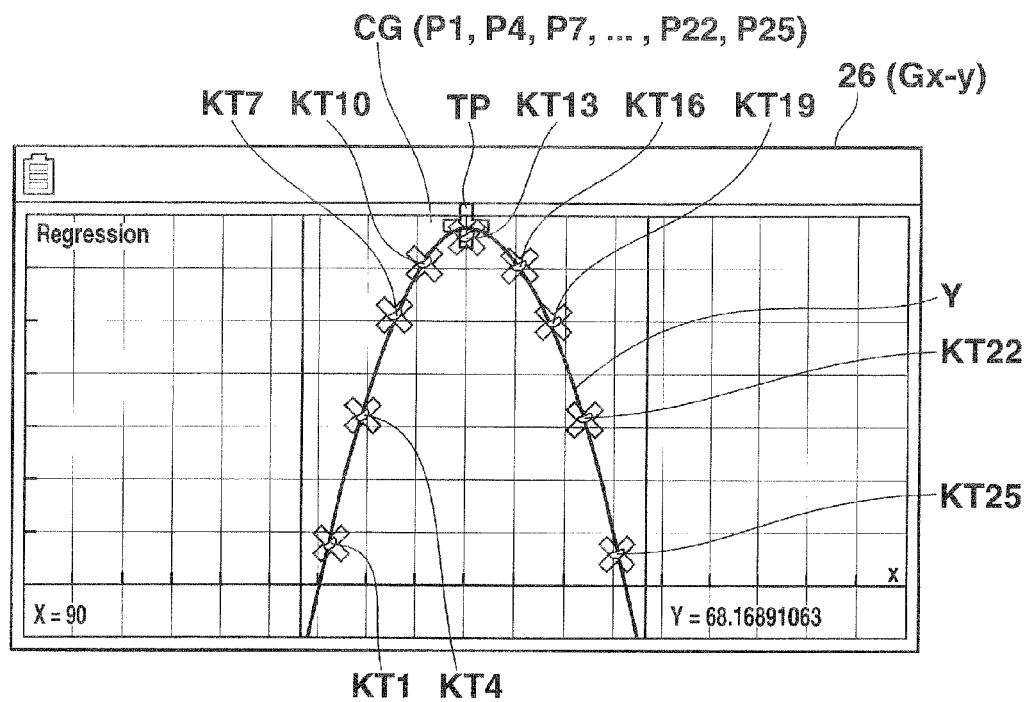
FIG. 16A is a view showing an x-y graph analysis display operation targeting extracted continuously shot images P1, P4, P7, P10, P13, P16, P19, P22, and P25 of hemisphere images in the graph function display processing by the graph function display device 20.

FIG. 16A is a view showing an x-y graph Y analysis display operation (x-y graph screen Gx-y) targeting the extracted continuously shot images P1, P4, P7, P10, P13, P16, P19, P22, and P25 of hemisphere images in the graph function display processing by the graph function display device 20.

Figure 16B:
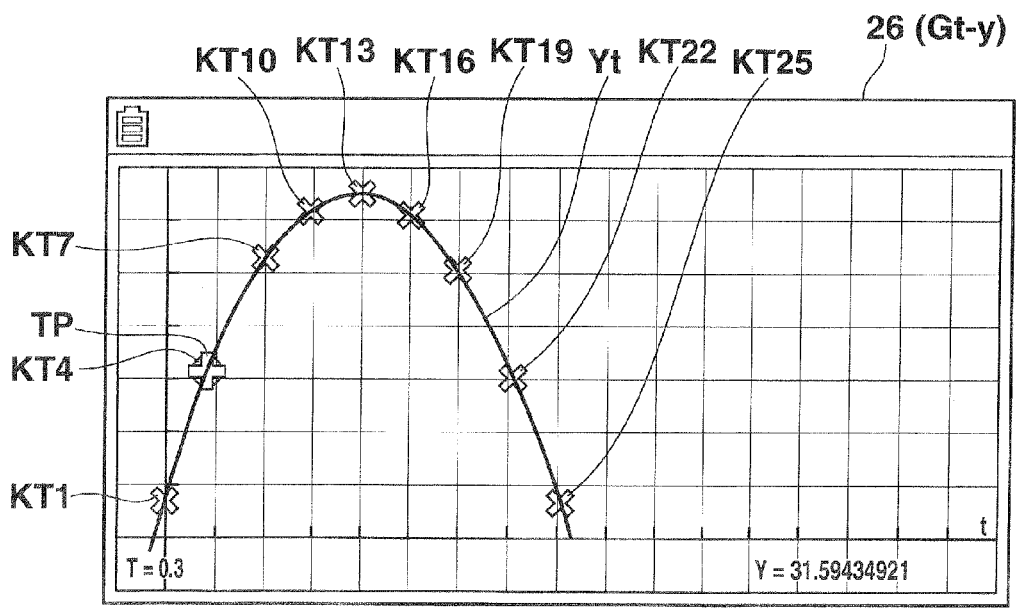
FIG. 16B is a view showing a t-y graph analysis display operation targeting the extracted continuously shot images P1, P4, P7, P10, P13, P16, P19, P22, and P25 of hemisphere images in the graph function display processing by the graph function display device 20.

FIG. 16B is a view showing a t-y graph Yt analysis display operation (t-y graph screen Gt-y) targeting the extracted continuously shot images P1, P4, P7, P10, P13, P16, P19, P22, and P25 of hemisphere images in the graph function display processing by the graph function display device 20.

According to the image file generation function (second embodiment) targeting high-speed continuously shot images of a moving object by the PC 10 having the above arrangement, the composite image CG (P3, P6, P9, P12, P15, P18, P21, and P24) of an extracted image file including continuously shot image P12 containing moving object KT12 closest to the feature point Qmax is compared with the composite image CG (P1, P4, P7, P10, P13, P16, P19, P22, and P25) of an extracted image file including continuously shot image P13 containing moving object KT13 second closest to the feature point Qmax. The extracted image file of P1, P4, P7, P10, ..., P25 exhibiting a better balance of moving objects (KT3, KT6, KT9, KT12, ..., KT24) on the left and right sides of the feature point Qmax is determined as a save target.

As a result, extracted continuously shot image files which are more effective as learning materials can be generated.

According to the image file generation function (second embodiment) targeting high-speed continuously shot images of a moving object by the PC 10 having the above arrangement, the recommended sampling interval table 12h (FIG. 12) is arranged. A recommended sampling interval without a fraction is set in advance for the shooting time interval Δt of sampled extracted continuously shot images (P1, P4, P7, P10, ..., P25) in accordance with the continuous shooting speed (shooting time interval) Δt of a continuously shot image file (original images P1, P2, P3, ..., P26) designated as a processing target.

This simplifies analysis and numerical display in the graph function display processing (FIG. 9) for sampled extracted continuously shot images.

According to the image file generation function (second embodiment) targeting high-speed continuously shot images or a moving object by the PC 10 having the above arrangement, if moving objects KT1, KT4, KT7, KT10, ..., KT25 detected from the composite image CG move from right to left in the shooting order in sampled extracted image 2 (P1, P4, P7, P10, ..., P25) at the recommended sampling interval, images P1, P4, P7, P10, ..., P25 are replaced with horizontally inverted images, which are saved in the image & coordinate range file storage unit 12f.

When analyzing and displaying an x-y graph Y and t-y graph Yt corresponding to the locus of moving objects KT1, KT4, KT7, KT10, ..., KT25 in sampled extracted image 2 (P1, P4, P7, P10, ..., P25) in subsequent graph function display processing (FIG. 9), the graphs can be developed and learned on standard coordinates whose numerical values increases rightward.

In the above embodiments, an extracted continuously shot image file (12f) is generated from image data obtained by high-speed continuous shooting (shooting time interval T) of a moving object. However, an extracted continuously shot image file (12f) can also be generated from image data obtained by moving image shooting (shooting time interval T of one frame of a moving image) according to the same image file generation processing as the above one (first/second embodiment).

The operation methods by the PC 10 and graph function display device 20 described in the above embodiments, that is, the methods such as image file generation processing (first embodiment) shown in the flowchart of FIG. 5, image file generation processing (second embodiment) shown in the flowcharts of FIGS. 13 and 14, and graph function display processing shown in the flowchart of FIG. 9 can be stored and distributed as computer-executable programs in the external recording medium 13 (33) such as a memory card (for example, ROM card or RAM card), magnetic disk (for example, floppy disk or hard disk), optical disk (for example, CD-ROM or DVD), or semiconductor memory. The computer 11 (31) of the electronic computer 10 (20) loads a program stored in the external recording medium 13 (33) into the storage device 12 (32), and controls the operation according to the loaded program. The computer 11 (31) can therefore implement the function of generating an extracted image file containing a feature point image from high-speed continuously shot images of a moving object, and the function of displaying a graph corresponding to the moving object locus of the generated extracted image file, which have been described in the above embodiments, and can execute the same processes according to the above-described methods.

Program data for implementing the methods can be transmitted in the form of program codes on a communication network (public line). The communication device 15 (35) connected to the communication network can load the program data into the computer 11 (31) of the electronic computer 10 (20). This can implement the function of generating an extracted image file containing a feature point image from high-speed continuously shot images of a moving object, and the function of displaying a graph corresponding to the moving object locus of the generated extracted image file.

Note that the present invention is not limited to the above-described embodiments and can be variously modified without departing from the scope of the invention in practical use. The embodiments include inventions on various stages, and various inventions can be extracted by an appropriate combination of building components disclosed. For example, when problems can be solved and effects are obtained even if several building components are omitted from all those described in the embodiments or several building components are combined in a different form, an arrangement obtained by omitting or combining the building components can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image editing apparatus comprising:
an image storage unit storing a series of images obtained by shooting a moving object at a first shooting time interval;
a moving position detection unit configured to detect positions of the moving object contained in the images for the series of images stored in the image storage unit;
a locus-of-movement detection unit configured to detect a locus of movement of the moving object based on the positions of the moving object contained in the series of images that have been detected by the moving position detection unit;
a feature image specifying unit configured to specify an image corresponding to a feature point of the locus of movement of the moving object that has been detected by the locus-of-movement detection unit;
an image extraction unit configured to extract, from the series of images stored in the image storage unit, a series of images which include the image specified by the feature image specifying unit and correspond to a second shooting time interval longer than the first shooting time interval; and
an extracted image file storage unit configured to store the series of images extracted by the image extraction unit as an image file,
wherein:
the feature image specifying unit includes a first image specifying unit configured to specify an image closest to the feature point of the locus of movement of the moving object that has been detected by the locus-of-movement detection unit, and a second image specifying unit configured to specify an image second closest to the feature point of the locus of movement of the moving object that has been detected by the locus-of-movement detection unit,
the image extraction unit includes a first image extraction unit configured to extract, as a first series of images from the series of images stored in the image storage unit, images which include the image specified by the first feature image specifying unit and correspond to the second shooting time interval longer than the first shooting time interval, and a second image extraction unit configured to extract, as a second series of images from the series of images stored in the image storage unit, images which include the image specified by the second feature image specifying unit and correspond to the second shooting time interval longer than the first shooting time interval, and
the extracted image file storage unit is configured to store, as the image file, a series of images in which horizontal symmetry of the positions of the moving object contained in the respective images that have been detected by the moving position detection unit is higher, out of the first series of images and the second series of images.

2. The apparatus according to claim 1, wherein the extracted image file storage unit is configured to store the series of images extracted by the image extraction unit as the image file together with the second shooting time interval.

3. The apparatus according to claim 1, further comprising:
a position correction information acquisition unit configured to acquire pieces of position correction information for use in position correction for the respective images based on positions of background images contained in the series of images stored in the image storage unit; and
a position correction unit configured to correct the positions of the moving object contained in the series of images that have been detected by the moving position detection unit in accordance with the pieces of position correction information for the respective images that have been acquired by the position correction information acquisition unit,
wherein the locus-of-movement detection unit is configured to detect the locus of movement of the moving object based on the positions of the moving object contained in the series of images that have been detected by the moving position detection unit and corrected by the position correction unit.

4. The apparatus according to claim 3, wherein the extracted image file storage unit is configured to store the series of images extracted by the image extraction unit as the image file together with the pieces of position correction information which have been acquired by the position correction information acquisition unit for the series of images.

5. The apparatus according to claim 4, further comprising:
an image composition display unit configured to correct positions of the series of images stored in the extracted image file storage unit in accordance with the pieces of position correction information of the respective images, and display the series of images as a composite image;
a graph display unit configured to display a graph corresponding to moving positions of the moving object contained in the composite image displayed by the image composition display unit while superimposing the graph on the composite image; and
a designated image identification display unit configured to display, on an uppermost layer of the composite image, an image designated in accordance with a user operation out of the series of images contained in the composite image displayed by the image composition display unit.

6. The apparatus according to claim 1, further comprising a recommended sampling interval setting unit configured to set in advance, in accordance with the first shooting time interval, the second shooting time interval, which is longer than the first shooting time interval and excludes a fraction,
wherein the image extraction unit is configured to extract, from the series of images stored in the image storage unit, images which include the image specified by the feature image specifying unit and correspond to the second shooting time interval set in advance by the recommended sampling interval setting unit.

7. An image editing apparatus comprising:
an image storage unit storing a series of images obtained by shooting a moving object at a first shooting time interval;
a moving position detection unit configured to detect positions of the moving object contained in the images for the series of images stored in the image storage unit;
a locus-of-movement detection unit configured to detect a locus of movement of the moving object based on the positions of the moving object contained in the series of images that have been detected by the moving position detection unit;
a feature image specifying unit configured to specify an image corresponding to a feature point of the locus of movement of the moving object that has been detected by the locus-of-movement detection unit;

an image extraction unit configured to extract, from the series of images stored in the image storage unit, a series of images which include the image specified by the feature image specifying unit and correspond to a second shooting time interval longer than the first shooting time interval;

an extracted image file storage unit configured to store the series of images extracted by the image extraction unit as an image file; and a moving direction determination unit configured to determine whether the positions of the moving object contained in the images that have been detected by the moving position detection unit for the series of images extracted by the image extraction unit move from right to left, wherein the extracted image file storage unit is configured to horizontally invert the series of images and store the series of images which have been horizontally inverted as the image file when the moving direction determination unit determines that the positions of the moving object contained in the extracted series of images move from right to left.

8. A non-transitory storage medium storing an image editing program for controlling a computer of an electronic device, the program controlling the computer to perform functions comprising:

storing a series of images obtained by shooting a moving object at a first shooting time interval in a memory;

detecting positions of the moving object contained in the images for the stored series of images;

detecting a locus of movement of the moving object based on the detected positions of the moving object contained in the series of images;

specifying an image corresponding to a feature point of the detected locus of movement of the moving object;

extracting, from the series of images stored in the memory, a series of images which include the specified image and correspond to a second shooting time interval longer than the first shooting time interval; and storing the extracted series of images as an image file in a memory, wherein:

said specifying includes (i) first specifying an image closest to the feature point of the locus of movement of the moving object that has been detected, and (ii) second specifying an image second closest to the feature point of the locus of movement of the moving object that has been detected, said extracting includes (i) first extracting, as a first series of images from the series of images stored in the memory, images which include the image specified in the first specifying and correspond to the second shooting time interval longer than the first shooting time interval, and (ii) second extracting, as a second series of images from the series of images stored in the memory, images which include the image specified in the second specifying and correspond to the second shooting time interval longer than the first shooting time interval, and said storing the extracted series of images includes storing, as the image file, a series of images in which horizontal symmetry of the positions of the moving object contained in the respective images that have been detected is higher, out of the first series of images and the second series of images.

9. A non-transitory storage medium storing an image editing program for controlling a computer of an electronic device, the program controlling the computer to perform functions comprising:

storing a series of images obtained by shooting a moving object at a first shooting time interval in a memory;

detecting positions of the moving object contained in the images for the stored series of images;

detecting a locus of movement of the moving object based on the detected positions of the moving object contained in the series of images;

specifying an image corresponding to a feature point of the detected locus of movement of the moving object;

extracting, from the series of images stored in the memory, a series of images which include the specified image and correspond to a second shooting time interval longer than the first shooting time interval;

storing the extracted series of images as an image file in a memory; and determining whether the positions of the moving object contained in the images that have been detected for the extracted series of images move from right to left, wherein said storing the extracted series of images includes horizontally inverting the series of images and storing the series of images which have been horizontally inverted as the image file when it is determined that the positions of the moving object contained in the extracted series of images move from right to left.

* * * * *